United States Patent
Okada et al.

(10) Patent No.: US 10,408,115 B2
(45) Date of Patent: Sep. 10, 2019

(54) ELECTRIC GENERATOR COOLING STRUCTURE FOR INTERNAL COMBUSTION ENGINE

(71) Applicant: HONDA MOTOR CO., LTD., Tokyo (JP)

(72) Inventors: Nozomi Okada, Wako (JP); Kazuma Tanaka, Wako (JP); Hirota Takeichi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 128 days.

(21) Appl. No.: 15/704,863

(22) Filed: Sep. 14, 2017

(65) Prior Publication Data
US 2018/0087437 A1 Mar. 29, 2018

(30) Foreign Application Priority Data

Sep. 27, 2016 (JP) ................................. 2016-188731

(51) Int. Cl.
*F01P 3/20* (2006.01)
*F01M 1/02* (2006.01)
(Continued)

(52) U.S. Cl.
CPC ................ *F01P 3/20* (2013.01); *F01M 1/02* (2013.01); *F01M 1/08* (2013.01); *F01P 7/14* (2013.01);
(Continued)

(58) Field of Classification Search
CPC ...... F01P 3/20; F01P 7/14; F01M 1/02; F01M 1/08; F02B 63/042; F02B 61/02; H02K 7/1815; H02K 9/19
See application file for complete search history.

(56) References Cited

U.S. PATENT DOCUMENTS

| 5,469,820 A | * | 11/1995 | Data | ..................... B60K 6/485 |
| | | | | 123/192.2 |
| 2003/0051679 A1 | * | 3/2003 | Iwata | ..................... B60K 6/24 |
| | | | | 123/41.31 |

(Continued)

FOREIGN PATENT DOCUMENTS

| EP | 1826368 A1 | 8/2007 |
| JP | 2898257 B2 | 5/1999 |

(Continued)

OTHER PUBLICATIONS

Extended European Search Report for European Application No. 17188230.1, dated Feb. 5, 2018.

*Primary Examiner* — Syed O Hasan
(74) *Attorney, Agent, or Firm* — Birch, Stewart, Kolasch & Birch, LLP

(57) ABSTRACT

An electric generator for generating electric energy upon rotation of a crankshaft supported in a crankcase of an internal combustion engine has an outer rotor and an inner rotor. An electric generator cooling structure includes a first cooling oil passage and a second cooling oil passage that are branched from a lubricating oil passage of a lubricating system of the engine toward the electric generator. A first ejection port is defined in a downstream end of the first cooling oil passage for ejecting lubricating oil to an outer side surface of the outer rotor, and a second ejection port is defined in a downstream end of the second cooling oil passage for ejecting lubricating oil to the inner stator disposed in the outer rotor. The electric generator cooling structure can thus efficiently cool the electric generator in its entirety.

12 Claims, 16 Drawing Sheets

(51) Int. Cl.
    *F01P 7/14* (2006.01)
    *F02B 63/04* (2006.01)
    *H02K 7/18* (2006.01)
    *H02K 9/19* (2006.01)
    *F01M 1/08* (2006.01)
    *F02B 61/02* (2006.01)

(52) U.S. Cl.
    CPC ......... *F02B 63/042* (2013.01); *H02K 7/1815* (2013.01); *H02K 9/19* (2013.01); *F01P 2007/146* (2013.01); *F02B 61/02* (2013.01)

(56) References Cited

U.S. PATENT DOCUMENTS

| | | | |
|---|---|---|---|
| 2003/0121490 A1* | 7/2003 | Hori | F01M 1/08 |
| | | | 123/196 R |
| 2007/0200439 A1* | 8/2007 | Nagahashi | F01M 1/08 |
| | | | 310/54 |
| 2014/0023484 A1* | 1/2014 | Watanabe | H02K 5/20 |
| | | | 415/116 |

FOREIGN PATENT DOCUMENTS

| | | |
|---|---|---|
| JP | 2986470 B1 | 12/1999 |
| JP | 2000-201453 A | 7/2000 |
| JP | 2001-258209 A | 7/2000 |
| JP | 2011-36127 A | 2/2011 |

* cited by examiner

ELECTRIC GENERATOR COOLING STRUCTURE FOR INTERNAL COMBUSTION ENGINE

TECHNICAL FIELD

The present invention relates to an electric generator cooling structure for cooling an electric generator provided in an internal combustion engine with lubricating oil.

BACKGROUND ART

One example of cooling device for cooling an electric generator provided in an internal combustion engine with lubricating oil is disclosed in Patent Document 1.

PRIOR ART DOCUMENT

Patent Document

Patent Document 1

Japanese Patent No. 2898257

Patent Document 1 discloses a structure wherein the opening of an oil passage formed in a generator cover that covers a side of an electric generator for an engine is formed to be directed downward in an area near the inner surface of the wall of the generator cover, ribs are formed radially or vertically on the inner surface, and oil flowing out of the downward opening of the oil passage is ejected along the ribs toward a coil-mounted stator of the electric generator.

SUMMARY OF THE INVENTION

Problems to be Solved by the Invention

As the oil is thus ejected to the stator of the electric generator to cool the stator only, heat tends to be trapped in an outer rotor, and the electric generator cannot be cooled efficiently in its entirety, so that the electric generator cannot be expected to have its efficiency of electric generation significantly increased.

The present invention has been made in view of the above problems. It is an object of the present invention to provide an electric generator cooling structure for an internal combustion engine which is capable of efficiently cooling an electric generator in its entirety.

Means for Solving the Problems

To accomplish the above object, there is provided in accordance with the present invention an electric generator cooling structure for an internal combustion engine wherein an electric generator for generating electric energy upon rotation of a crankshaft supported in a crankcase of the internal combustion engine has an outer rotor rotatable in unison with the crankshaft, the outer rotor being of a bottomed hollow cylindrical shape and supporting magnets on an inner circumferential surface thereof, and an inner rotor having coils disposed in the outer rotor, including a first cooling oil passage and a second cooling oil passage that are branched from a lubricating oil passage of a lubricating system of the internal combustion engine toward the electric generator, a first ejection port defined in a downstream end of the first cooling oil passage for ejecting lubricating oil to an outer side surface of the outer rotor, and a second ejection port defined in a downstream end of the second cooling oil passage for ejecting lubricating oil to the inner stator disposed in the outer rotor.

With this arrangement, the two cooling oil passages, i.e., the first cooling oil passage and the second cooling oil passage, are branched from the lubricating oil passage of the lubricating system of the internal combustion engine toward the electric generator, the first ejection port defined in the downstream end of the first cooling oil passage ejects lubricating oil to the outer side surface of the outer rotor to cool the outer rotor, and the second ejection port defined in the downstream end of the second cooling oil passage ejects lubricating oil to the inner stator disposed in the outer rotor to cool the inner stator. The electric generator is thus efficiently cooled for enhanced electric generation efficiency.

In the above arrangement, the outer rotor may be of a bottomed hollow cylindrical shape having a hollow cylindrical portion and a bottom wall, the bottom wall being fixed to an end of the crankshaft such that the hollow cylindrical portion has an opening directed outwardly along an axial direction of the crankshaft, and the second cooling oil passage may have a downstream portion defined in a generator cover covering an axially outer side of the electric generator.

With this arrangement, the outer rotor of the electric generator is open outwardly along the axial direction of the crankshaft, and the inner stator disposed in the outer rotor has an axially outer side that is open. Since the inner stator faces the generator cover that covers the axially outer side of the electric generator, lubricating oil can be ejected from the second ejection port defined in the downstream end of the second cooling oil passage in the generator cover to the inner stator for cooling the inner stator.

In the above arrangement, the lubricating system of the internal combustion engine may include a scavenging pump and a feed pump, and the first cooling oil passage and the second cooling oil passage may be branched from a scavenger lubricating oil passage which guides lubricating oil discharged from the scavenging pump.

With this arrangement, as the first cooling oil passage and the second cooling oil passage that guide lubricating oil for cooling the electric generator are branched from the scavenger lubricating oil passage which guides lubricating oil discharged from the scavenging pump, the electric generator can be cooled by the lubricating oil discharged from the scavenging pump. Therefore, an upper limit for the oil pressure discharged from the feed pump can be lowered, thereby reducing the burden on the feed pump and the load applied from the feed pump to oil seals in a feeder relief oil passage, so that the feed pump can be reduced in size.

In the above arrangement, the first cooling oil passage may include a scavenger relief cooling oil passage branched from an outlet port of the scavenging pump and housing a scavenger relief valve therein, and the first election port may be defined in a discharge side of the scavenger relief valve.

With this arrangement, the first cooling oil passage that guides lubricating oil for cooling the outer rotor of the electric generator is branched from the outlet port of the scavenging pump and serves as the scavenger relief cooling oil passage with the scavenger relief valve placed therein. Therefore, excessive oil from the scavenging pump under an adjusted pressure is discharged from the scavenging relief valve. The excessive oil contains a large amount of oil mist, which is effective to efficiently cool the outer rotor by rotating with the outer rotor.

In the above arrangement, the scavenger lubricating oil passage may include downstream-end lubricating oil passageways provided in an upper wall of the crankcase above a region where gear trains of a transmission disposed in a transmission chamber in the crankcase are held in mesh with each other, and the downstream-end lubricating oil passageways may have discharge ports defined therein from which lubricating oil drops onto the gear trains that mesh with each other.

With this arrangement, the scavenger lubricating oil passage that guides lubricating oil discharged from the scavenging pump includes the downstream-end lubricating oil passageways defined in the upper wall of the crankcase above the region where the gear trains of the transmission disposed in the crankcase are held in mesh with each other, and the downstream-end lubricating oil passageways have the discharge ports defined therein from which lubricating oil drops onto the gear trains that mesh with each other. As lubricating oil discharged from the scavenging pump is used to drop onto and lubricate the meshing gear trains of the transmission, the burden on the feed pump is further reduced, making it possible to reduce the size of the feed pump.

In the above arrangement, a branch lubricating oil passageway may be branched upstream from the downstream-end lubricating oil passageways of the scavenger lubricating oil passage, the branch lubricating oil passageway may be held in fluid communication with an axial oil passageway defined in a transmission gear shaft on which one of the gear trains is supported, and the transmission gear shaft may have a supply port defined therein for supplying lubricating oil from the axial oil passageway to a gear sliding surface of the transmission gear shaft.

With this arrangement, the branch lubricating oil passageway branched upstream from the downstream-end lubricating oil passageways that guide lubricating oil discharged from the scavenging pump is held in fluid communication with the axial oil passageway defined in the transmission gear shaft, and the transmission gear shaft has the supply port provided therein for supplying lubricating oil from the axial oil passageway to the gear sliding surface of the transmission gear shaft. Consequently, lubricating oil discharged from the scavenging pump is supplied to the axial oil passageway and used to lubricate the gear sliding surface of the transmission gear shaft, so that the burden on the feed pump is yet further reduced, making it possible to further reduce the size of the feed pump.

In the above arrangement, the internal combustion engine may include a clutch provided with a clutch release mechanism and mounted on an end of the transmission gear shaft, the clutch release mechanism may include a clutch release rod axially movably inserted in the transmission gear shaft, a clutch release lever, and a release cam shaft having a cam face for converting angular movement of the clutch release lever into axial movement of the clutch release rod in the transmission gear shaft to disengage the clutch, and lubricating oil passageways extending from the branch lubricating oil passageway in a direction away from the axial oil passageway may be held in fluid communication with a tubular holder by which the release cam shaft is angularly movably held.

With this arrangement, the clutch release mechanism is a mechanism wherein angular movement of the clutch release lever is converted by the cam face into axial movement of the clutch release rod in the transmission gear shaft to disengage the clutch, and the lubricating oil passageways extending from the branch lubricating oil passageway in the direction away from the axial oil passageway are held in fluid communication with the tubular holder by which the release cam shaft is angularly movably held. Therefore, lubricating oil in the axial oil passageway for lubricating the gear sliding surface of the transmission gear shaft is used to lubricate the release cam shaft for its turning movement.

In the above arrangement, the scavenger relief valve may be disposed in a position lower than any of the scavenger lubricating oil passage, the first cooling oil passageway, the second cooling oil passageway, the branch lubricating oil passageway, and the axial oil passageway.

With this arrangement, inasmuch as the scavenger relief valve is disposed in the position lower than any of the scavenger lubricating oil passage, the first cooling oil passageway, the second cooling oil passageway, the branch lubricating oil passageway, and the axial oil passageway, the scavenger lubricating oil passage, the first cooling oil passageway, the second cooling oil passageway, the branch lubricating oil passageway, and the axial oil passageway are filled with lubricating oil. When the internal oil pressure builds up until it goes beyond a predetermined internal pressure of the scavenger relief valve, the scavenger relief valve is opened to supply lubricating oil to all necessary components under suitable oil pressure for enhanced lubricating and cooling performance.

In the above arrangement, the crankcase may include a left crankcase member and a right crankcase member that are separated from, but joined to each other, the scavenging pump may be provided along mating surfaces of the left crankcase member and the right crankcase member, and the feed pump may be disposed in the crankcase remotely from the electric generator across the scavenging pump.

With this arrangement, since the crankcase includes the left and right crankcase members that are separated from, but joined to each other, the scavenging pump is provided along the mating surfaces of the left and right crankcase members, and the feed pump is disposed in the crankcase remotely from the electric generator across the scavenging pump, the feed pump is disposed closely to the scavenging pump out of physical interference with the electric generator, and the first cooling oil passage and the second cooling oil passage that extend from the scavenging pump to the electric generator are shortened, making it possible to reduce the size of the internal combustion engine.

In the above arrangement, the scavenger relief valve may be provided in one of the left crankcase member and the right crankcase member on which the electric generator is mounted.

With this arrangement, because the scavenger relief valve may be provided in one of the left crankcase member and the right crankcase member on which the electric generator is mounted, the lubricating system provides a compact structure wherein the scavenger relief valve is disposed out of physical interference with the feed pump, the first cooling oil passageway is shortened, and excessive oil discharged from the scavenger relief valve is used to cool the electric generator.

In the above arrangement, the scavenging pump and the feed pump may be actuatable by a common pump drive shaft, the feed pump may have an outlet port from which a feeder relief oil passage is branched, the feeder relief oil passage housing a feeder relief valve disposed therein, and the feeder relief oil passage may be disposed on a side of the feed pump remotely from the scavenging pump and oriented in a direction perpendicular to an axis of the pump drive shaft.

With this arrangement, as the scavenging pump and the feed pump are actuated by the common pump drive shaft, the scavenging pump and the feed pump can be positioned closely to each other and arranged compactly by the common pump drive shaft. Since the relief oil passageway branched from the outlet port of the feed pump and housing the feeder relief valve therein is disposed on the side of the feed pump remotely from the scavenging pump and oriented in the direction perpendicular to the axis of the pump drive shaft, the feeder relief valve is disposed compactly in the vicinity of the feed pump out of physical interference with the scavenging pump. Consequently, the feeder lubricating oil passage is shortened to make the lubricating system small in size.

Effects of the Invention

According to the present invention, the two cooling oil passages, i.e., the first cooling oil passage and the second cooling oil passage, are branched from the lubricating oil passage of the lubricating system of the internal combustion engine toward the electric generator, the first ejection port defined in the downstream end of the first cooling oil passage ejects lubricating oil to the outer side surface of the outer rotor to cool the outer rotor, and the second ejection port defined in the downstream end of the second cooling oil passage ejects lubricating oil to the inner stator disposed in the outer rotor to cool the inner stator. The electric generator is thus efficiently cooled for enhanced electric generation efficiency.

MODE FOR CARRYING OUT THE INVENTION

An electric generator cooling structure according to an embodiment of the present invention will be described below with reference to FIGS. 1 through 20.

Figure 1:
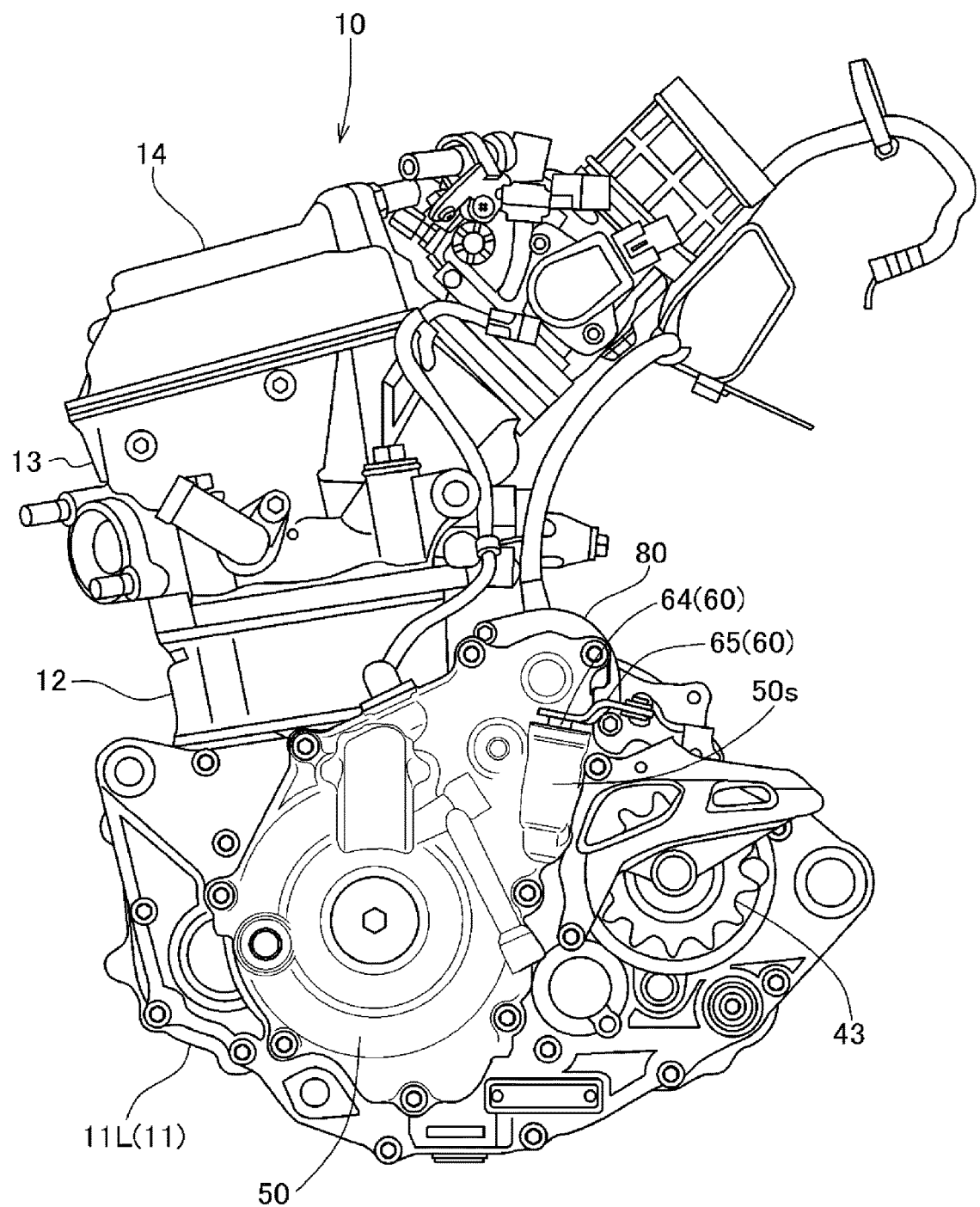
FIG. 1 is a side elevational view of an internal combustion engine in its entirety according to an embodiment of the present invention.

FIG. 1 is a side elevational view of an internal combustion engine 10 in its entirety for use on a motorcycle according to the embodiment of the present invention.

In the following description, directions such as forward, rearward, leftward, and rightward directions will be specified in accord with normal standards for motorcycles where the direction in which they travel forwardly is referred to as forward direction. In some of the figures, FR represents the forward direction, RR the rearward direction, LH the leftward direction, and RH the rightward direction.

The internal combustion engine 10 includes a single-cylinder four-stroke internal combustion engine and incorporates a dry sump lubricating system.

As depicted in FIG. 1, the internal combustion engine 10 includes a crankshaft 20 (see FIG. 2) rotatably supported by a crankcase 11 having a crankcase chamber 11C (see FIG. 3) that houses the crankshaft 20 therein and a transmission chamber 11M (see FIG. 4) that houses a transmission 40 therein rearwardly of the crankcase chamber 11C. An oil reservoir 11T (see FIG. 2) that protrudes downwardly from the crankcase chamber 11C for storing lubricating oil is defined in a lower portion of the transmission chamber 11M.

Figure 2:
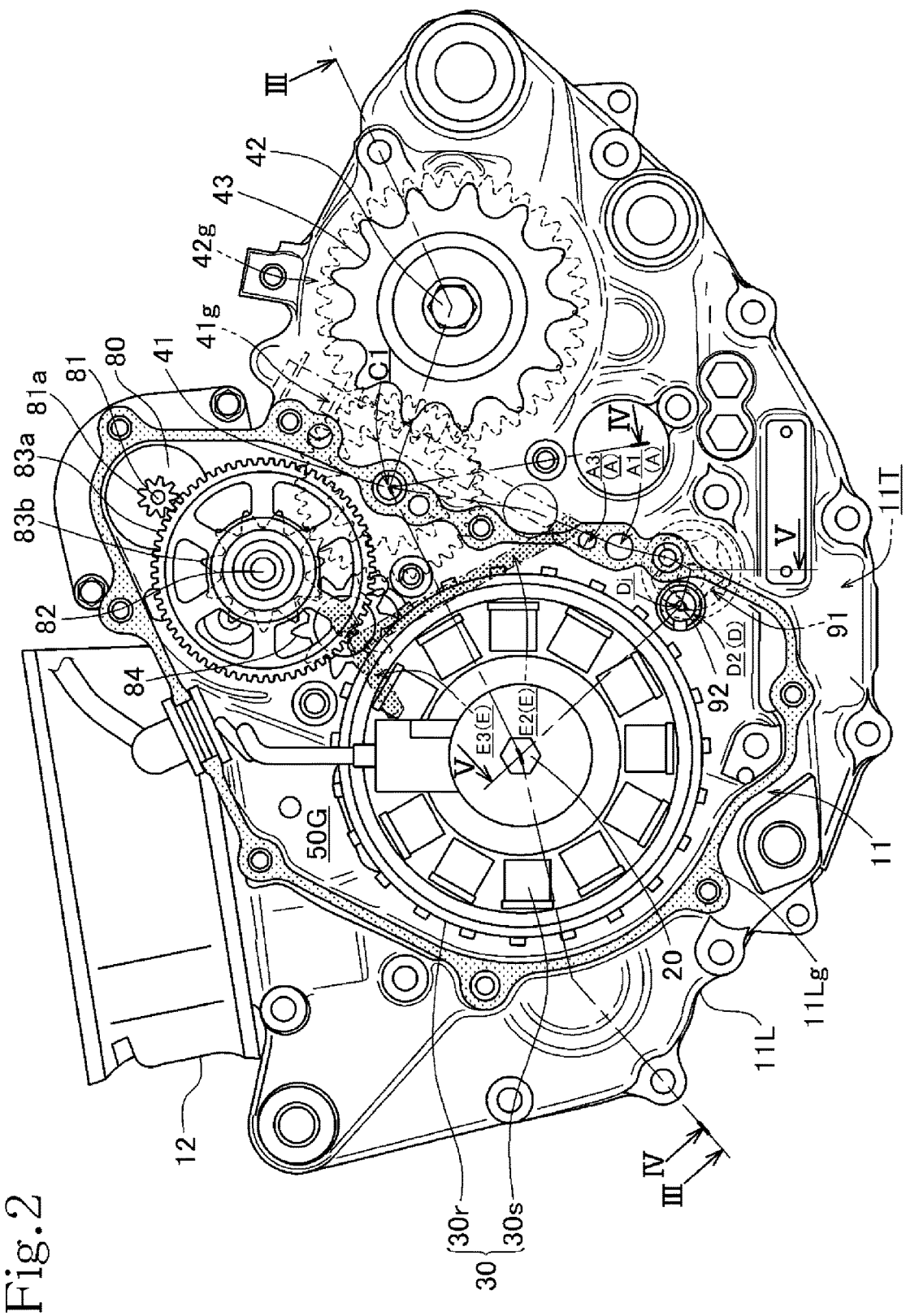
FIG. 2 is a side elevational view of the internal combustion engine with a side cover removed.
Figure 3:
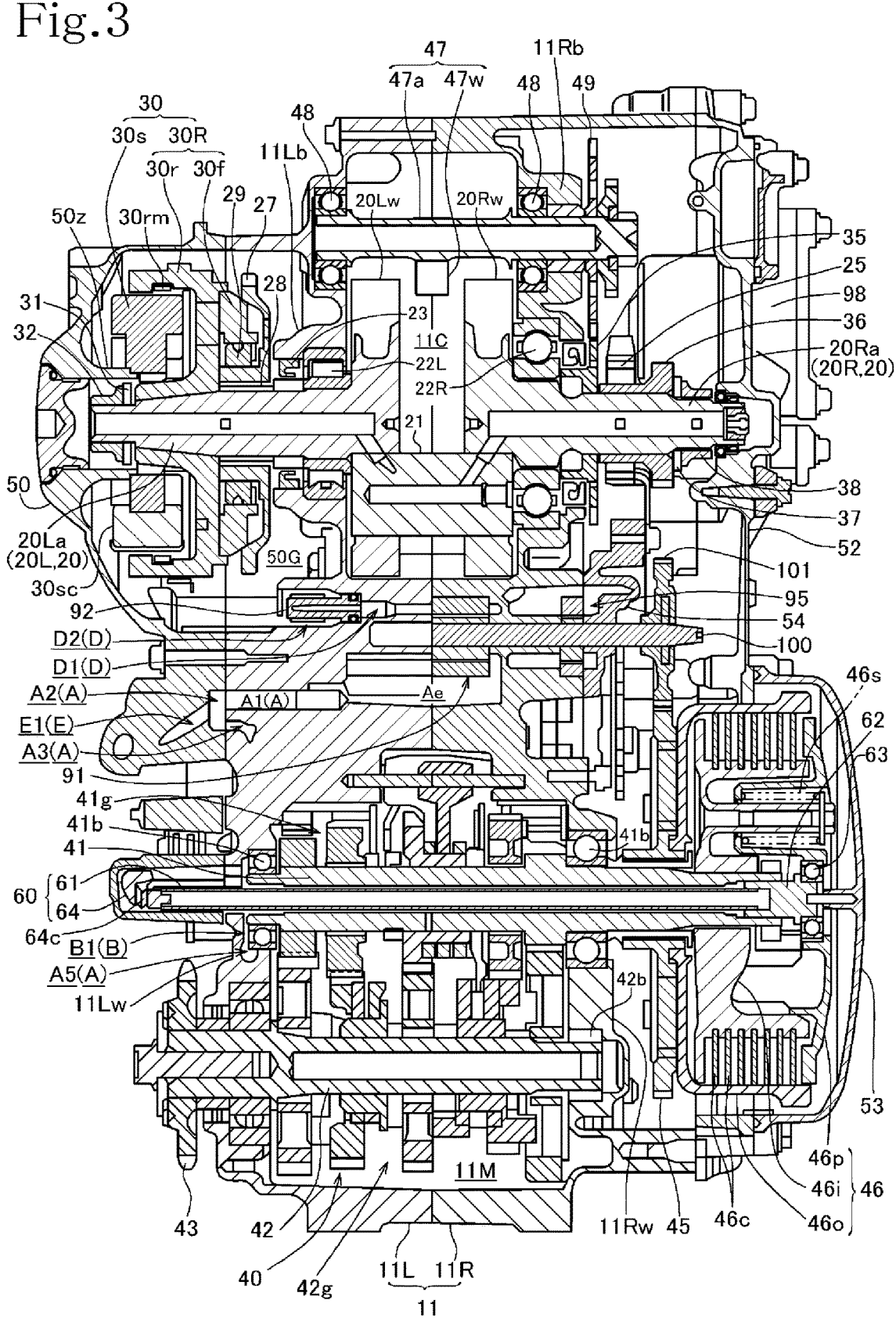
FIG. 3 is a cross-sectional view taken along line III-III of FIG. 2.

Referring to FIGS. 2 and 3, a cylinder block 12 with a single cylinder defined therein is mounted on the crankcase 11 over the crankcase chamber 11C therein, and a cylinder head 13 is mounted on the cylinder block 12 with a gasket interposed therebetween. The cylinder block 12 and the cylinder head 13 are fastened together to the crankcase 11 by stud bolts. The cylinder head 13 has its upper end covered with a cylinder head cover 14.

The cylinder block 12, the cylinder head 13, and the cylinder head cover 14 that are disposed on the crankcase 11 extend upwardly and are inclined slightly forwardly from the crankcase 11 (see FIG. 1).

The crankcase 11, which is coupled to the lower end of the cylinder bock 12, includes a pair of crankcase members, i.e., a left crankcase member 11L and a right crankcase member 11R, that are separated from each other by a plane including the center axis of the cylinder and lying perpendicularly to the crankshaft 20. The left crankcase member 11L and the right crankcase member 11R have respective mating surfaces held against each other and are coupled to each other by bolts.

The crankshaft 20 extends horizontally along the leftward and rightward directions and is rotatably supported in the crank case chamber 11C that is defined in the left crankcase member 11L and the right crankcase member 11R coupled together. As shown in FIG. 3, the crankshaft 20 includes a pair of left and right crankshaft members 20L and 20R that are integrally joined to each other by a crankpin 21. The left and right crankshaft members 20L and 20R include respective left and right crankshaft bodies 20La and 20Ra aligned coaxially with each other and respective left and right crankshaft webs 20Lw and 20Rw integral with the left and right crankshaft bodies 20La and 20Ra and axially facing each other. The left and right crankshaft webs 20Lw and 20Rw that face each other are joined to each other by the crankpin 21 that is radially displaced off the central axis of the crankshaft 20.

The left crankcase member 11L and the right crankcase member 11R, on which the crankshaft 20 is rotatably supported, have respective left and right bearing walls 11Lw and 11Rw that face each other and include respective left and right main bearing casings 11Lb and 11Rb. The left and right crankshaft bodies 20La and 20Ra of the crankshaft 20 have respective journals rotatably supported by a roller bearing 22L and a ball bearing 22R that are fitted respectively in the main bearing casings 11Lb and 11Rb.

Therefore, the crankshaft webs 20Lw and 20Rw and the crankpin 21 are housed in the crankcase chamber 11C between the mutually facing bearing walls 11Lw and 11Rw, and the crankshaft bodies 20La and 20Ra project outwardly in the leftward and rightward directions from the bearing walls 11Lw and 11Rw.

The left crankshaft body 20La includes a portion projecting leftwardly from the main bearing casing 11Lb of the left bearing wall 11Lw. An AC electric generator, i.e., an alternator, 30 has a generator rotor 30R fitted over the projecting portion of the left crankshaft body 20La with a starter driven gear 27 and a one-way clutch 29 interposed thereon between the rotor 30R and the main bearing casing 11Lb. The rotor 30R is fastened to the projecting portion of the left crankshaft body 20La by a nut 32 with a washer 31 interposed between the nut 32 and the rotor 30R.

The left main bearing casing 11Lb has an outer circumferential surface tapered to the left and houses therein the roller bearing 22L fitted against an inner circumferential surface thereof and an oil seal ring 23 fitted in an tip end opening defined in the left main bearing casing 11Lb adjacent to the roller bearing 22L.

Figure 13:
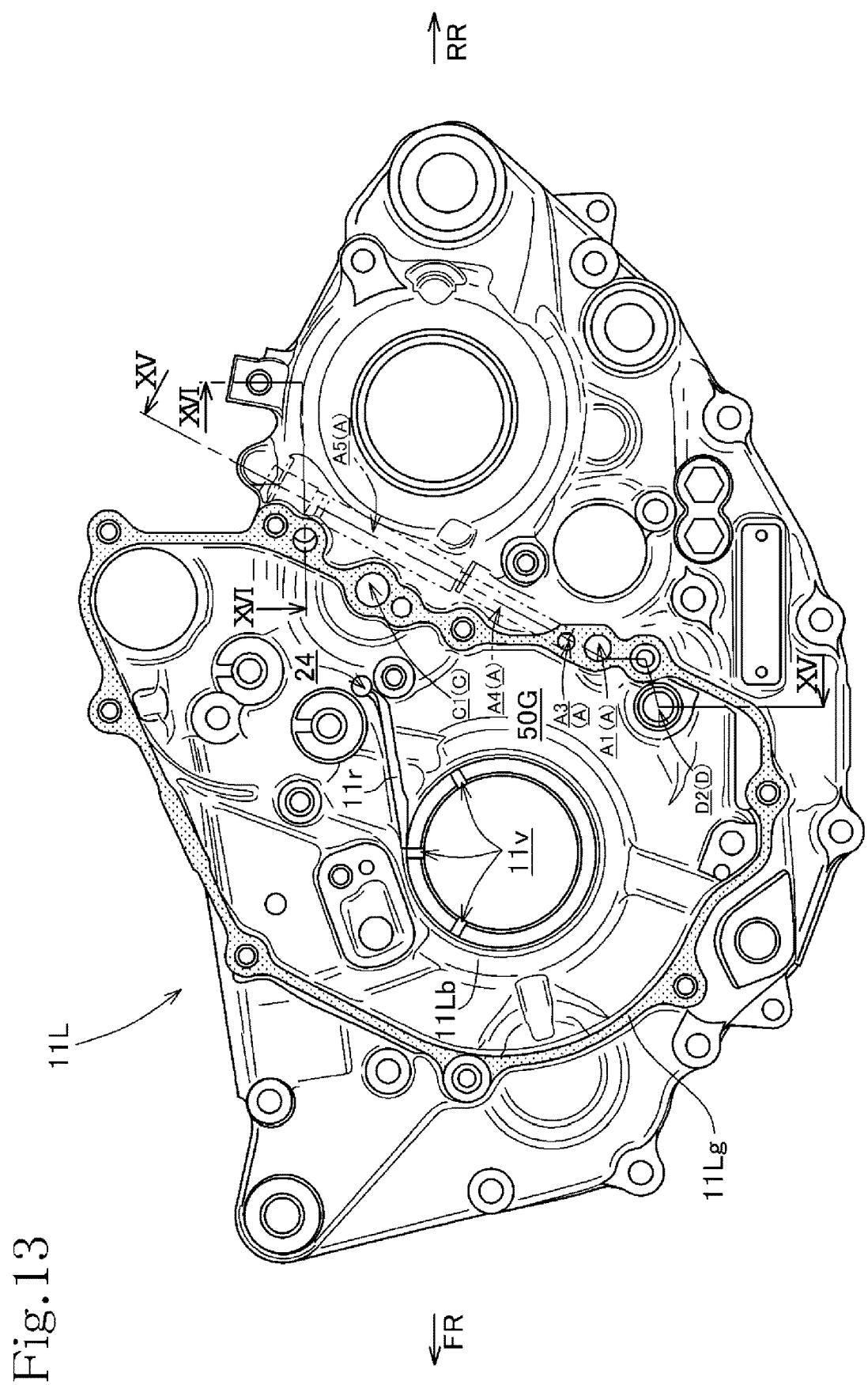
FIG. 13 is a left-hand side elevational view of a left crankcase member.

The left main bearing casing 11Lb projects leftward closely to the starter driven gear 27. As depicted in FIG. 13, the left main bearing casing 11Lb has three radial grooves 11v defined in an upper half of a left tip end face thereof around the tip end opening therein near the starter driven gear 27.

A communication hole 24 is defined through the bearing wall 11Lw rearwardly and obliquely upwardly of the main bearing casing 11Lb and held in fluid communication with the transmission chamber 11M. A rib 11r is formed on a left side surface of the bearing wall 11Lw and extends obliquely forwardly and downwardly from the opening of the communication hole 24 to an upper portion of the main bearing casing 11Lb.

Oil in the transmission chamber 11M flows through the communication hole 24 to the left side surface of the bearing wall 11Lw, then along the inclined rib 11r to the upper portion of the main bearing casing 11Lb, from which the oil flows on the tapered outer circumferential surface of the main bearing casing 11Lb to the left tip end face thereof, where the coil flows into the three grooves 11v. Therefore, the oil effectively lubricates the gap between the main bearing casing 11Lb and the starter driven gear 27 near the tip end opening in the main bearing casing 11Lb (see FIG. 3).

The rotor 30R of the generator 30 includes a flywheel 30f fitted over the left crankshaft body 20La and a cup-shaped or bottomed hollow cylindrical outer rotor 30r fixed to the flywheel 30f by bolts. The generator 30 also includes an inner stator 30s fixed to a hollow cylindrical support 50z of a generator cover 50 that covers the left side of the generator 30 and other parts.

The outer rotor 30r, which rotates in unison with the crankshaft 20 through the flywheel 30f, has a hollow cylindrical portion that is open to the left. The inner stator 30s has a stator core having coils 30sc wound thereon and facing inner sides of magnets 30rm disposed on an inner circumferential surface of the hollow cylindrical portion of the outer rotor 30r.

The starter driven gear 27 is rotatably supported on the left crankshaft body 20La by a needle bearing 28, and the one-way clutch 29 is interposed between the starter driven gear 27 and the flywheel 30f.

The right crankshaft body 20Ra includes a portion projecting rightward from the right bearing wall 11Rw for the crankshaft 20. A balancer drive gear 35 and a primary drive gear 36 are fitted side by side over the projecting portion of the right crankshaft body 20Ra and fastened thereto by a nut 38 with a washer 37 interposed between the nut 38 and the primary drive gear 36.

The primary drive gear 36 has a hollow cylindrical boss fitted over the projecting portion of the right crankshaft body 20Ra, and a drive chain sprocket 25 is fitted over the hollow cylindrical boss of the primary drive gear 36. The drive chain sprocket 25 transmits engine power to a valve operating system or valve train of the internal combustion engine 10 through a cam chain, not shown, that is trained around the drive chain sprocket 25 and a driven chain sprocket, not depicted, fitted over the camshaft of the valve train, which is mounted in the cylinder head 13.

As depicted in FIG. 3, a balancer 47 is disposed forwardly of the crankshaft 20.

The balancer 47 includes a balancer shaft 47a having a balance weight 47w that turns between the left and right crankshaft webs 20Lw and 20Rw. The balancer shaft 47a is rotatably supported on the left and right bearing walls 11Lw and 11Rw by respective bearings 48.

The balancer shaft 47a has a right portion projecting to the right from the right bearing wall 11Rw. A balancer driven gear 49 is mounted on the projecting right portion of the balancer shaft 47a and held in mesh with the balancer drive gear 35 fitted over the crankshaft 20.

The balancer drive gear 35 and the balancer driven gear 36 that are in mesh with each other have the same diameter and number of teeth as each other, so that the balancer weight 47w will rotate at the same speed as, but in the opposite direction to, the crankshaft 20 for thereby reducing primary vibrations caused by reciprocating movement of a piston 16 in the cylinder 12a.

As depicted in FIG. 3, the transmission 40 has a main shaft 41 and a countershaft 42 extending horizontally in the leftward and rightward directions in the transmission chamber 11M in the crankcase 11 and rotatably supported parallel to each other on the left and right bearing walls 11Lw and 11Rw by left and right bearings 41b and 42b. A main gear train 41g supported on the main shaft 41 and a counter gear train 42g supported on the countershaft 42 are held in mesh with each other at all times, making up the transmission 40.

The countershaft 42 has a left portion extending leftward through the crankcase 11 and serving as an output shaft with an output sprocket 43 fitted over its left end.

A drive chain is trained around the output sprocket 43 and a driven sprocket, not depicted, on a rear wheel, making up a chain power transmitting mechanism for transmitting engine power to the rear wheel.

Figure 4:
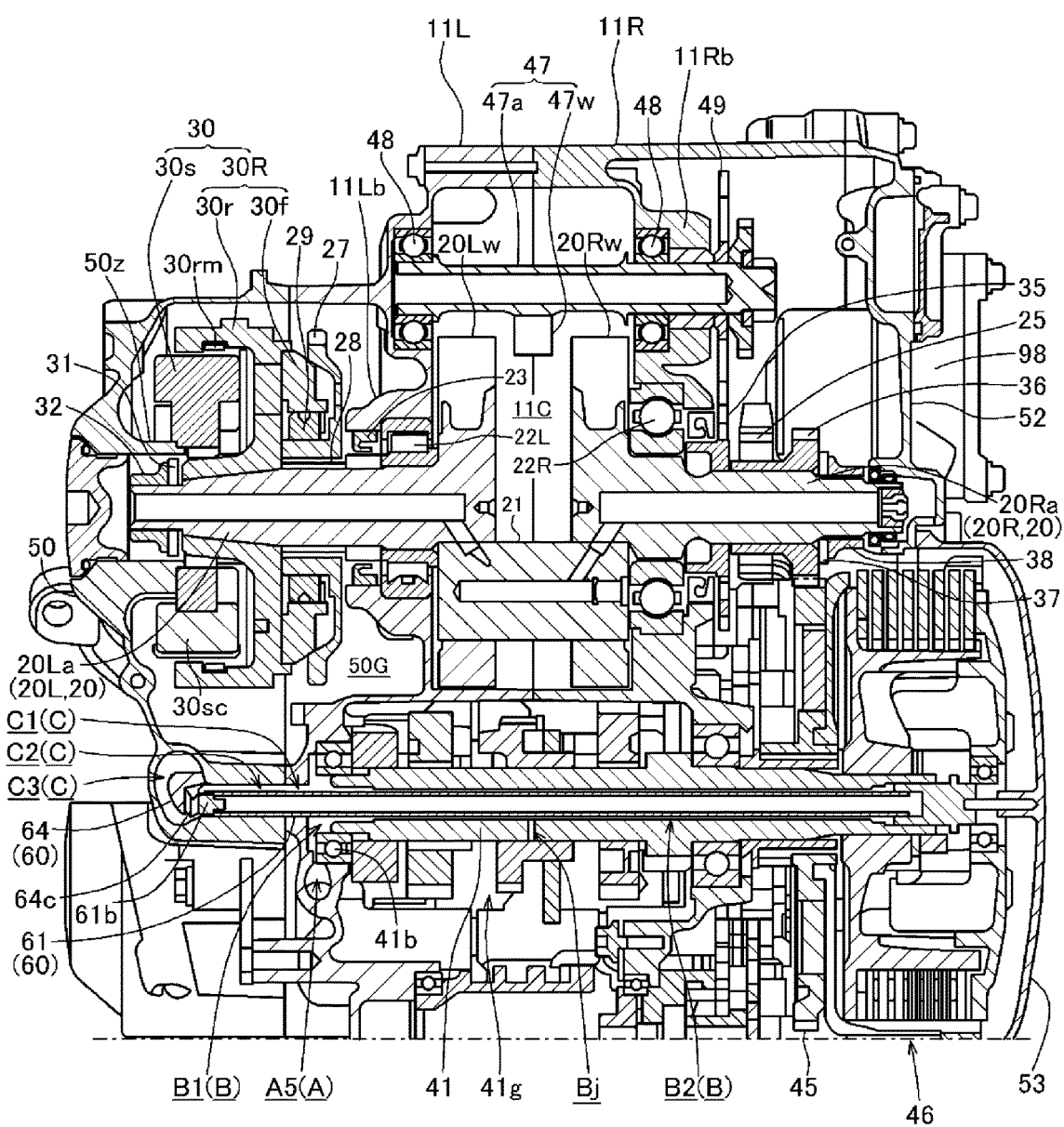
FIG. 4 is a cross-sectional view taken along line IV-IV of FIG. 2.

As depicted in FIGS. 3 and 4, the main shaft 41 has a right portion projecting rightward from the right bearing wall 11Rw, and a multiple-disc friction transmission clutch 46 is mounted on the projecting right portion of the main shaft 41.

The transmission clutch 46 includes a clutch outer 46o supported on a primary driven gear 45 rotatably supported on the main shaft 41 with a damping member interposed between the clutch outer 46o and the primary driven gear 45, and a clutch inner 46i integrally fitted over the main shaft 41 with a plurality of clutch discs 46c interposed between the clutch outer 46o and the clutch inner 46i. When a pressure plate 46p is pushed to the left by a clutch spring 46s, the clutch discs 46c are brought into frictional contact with each other, engaging the transmission clutch 46. When the pressure plate 46p is moved to the right against the force of the clutch spring 46s, the clutch discs 46c are brought out of frictional contact with each other, disengaging the transmission clutch 46.

The transmission clutch 46 is provided with a clutch release mechanism 60.

The clutch release mechanism 60 has a hollow release rod 61 slidably inserted in an axial hole defined in the main shaft 41 and a cap 62 fitted over the right end of the release rod 61. The pressure plate 46p is rotatably supported on a bearing boss 62b on the tip end of the cap 62 by a bearing 63.

When the release rod 61 is pushed to the right, the pressure plate 55 is moved to the right through the bearing 63 against the force of the clutch spring 46s, the transmission clutch 46 is disengaged.

As depicted in FIG. 3, the main shaft 41 has a left end rotatably supported on the left bearing wall 11Lw of the crankcase 11 by the left bearing 41b. The release rod 61 inserted in the axial hole in the main shaft 41 has a left portion projecting from the left end of the main shaft 41 out of the left bearing wall 11Lw.

Figure 6:
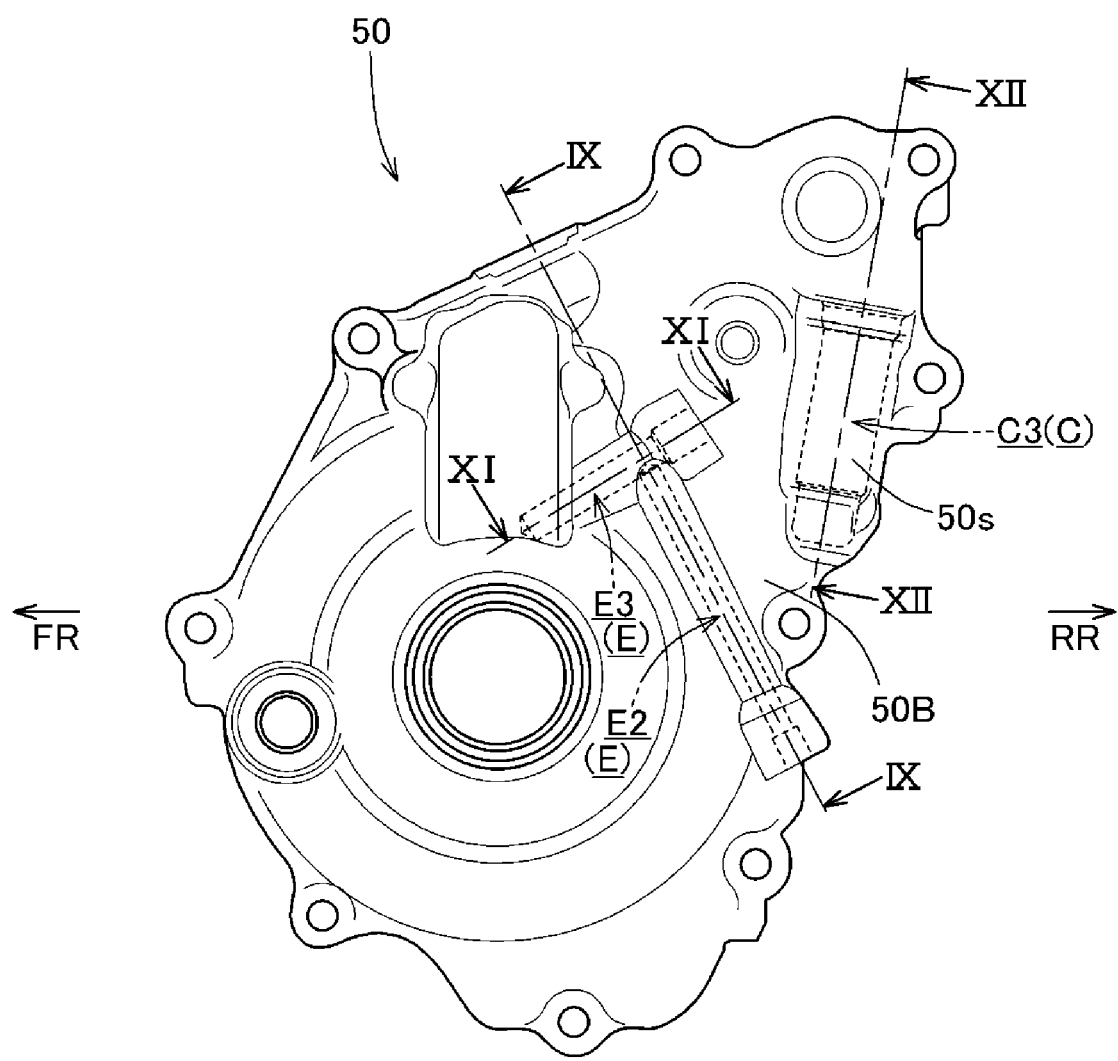
FIG. 6 is a left-hand side elevational view of an electric generator cover.

As depicted in FIG. 6, the generator cover 50 that covers the left side of the left crankcase member 11L includes a tubular side wall portion 50s bulging outwardly, i.e., leftwardly, which serves as a tubular holder oriented substantially vertically. The tubular side wall portion 50s has a lower portion extending perpendicularly to a hole 50a (see FIG. 7) that is defined in the generator cover 50 and open at a mating surface 50g thereof which is mated to the left crankcase member 11L. The tubular side wall portion 50s and the hole 50a are thus held in fluid communication with each other.

The left portion of the release rod 61 that projects out of the left bearing wall 11Lw has its left end inserted in the hole 50a.

As depicted in FIGS. 3 and 4, a release camshaft 64 is inserted in the tubular side wall portion 50s and has a cam face 64c on its lower tip end which engages the left end of the release rod 61 that extends perpendicularly to the release camshaft 64.

Specifically, the cam face 64c on the lower tip end of the release camshaft 64 includes a surface formed by cutting off a portion of the release camshaft 64 at an angle of approximately 90°. The cam face 64c is held in abutment against a left end member 61b disposed in the left end of the release rod 61. When the release camshaft 64 turns about its own axis, the cam face 64c pushes the left end member 61b to the right, thereby causing the release rod 61 to slide to the right.

As shown in FIG. 1, the release camshaft 64 inserted in the tubular side wall portion 50s has an upper end portion, remote from the cam face 64c, projecting from the tubular side wall portion 50s. A clutch release lever 65 has an end fitted over the projecting upper end portion of the release camshaft 64.

The clutch release lever 65 extends from its end fitted over the projecting upper end portion of the release camshaft 64 in a direction perpendicular to the release camshaft 64.

When the clutch release lever 65 is swung, the release camshaft 64 is turned to cause the cam face 64c thereof to act on the left end member 61b in the release rod 61, pushing the release rod 61 to the right. The release rod 61 moves the pressure plate 46p of the transmission clutch 46 to the right, thereby disengaging the transmission clutch 46.

As shown in FIGS. 3 and 4, the right bearing wall 11Rw of the right crankcase member 11R has its right side covered with a right case cover 52. The right case cover 52 also covers the balancer driven gear 49 on the right portion of the balancer shaft 47a and the balancer drive gear 35 and the primary drive gear 36 on the right crankshaft body 20Ra. The right case cover 52 has an opening through which the transmission clutch 46 on the right portion of the main shaft 41 projects to the right. The transmission clutch 46 is covered with a clutch cover 53 mounted on the right case cover 52.

As depicted in FIGS. 1 and 2, a starter motor 80 is disposed on an upper wall of the crankcase 11 behind the cylinder block 12 that is inclined slightly forward from the crankcase 11.

The starter motor 80 has a drive shaft 81 fitted from the right into an upwardly bulging side wall of the left crankcase member 11L. The side wall into which the drive shaft 81 is fitted is covered with the generator cover 50.

As depicted in FIG. 2, a speed reducer gear shaft 82 extending between and supported on the left crankcase member 11L and the generator cover 50 is disposed between the drive shaft 81 and the crankshaft 20. A larger-diameter gear 83a and a smaller-diameter gear 83b that are integrally formed coaxially with each other are supported on the speed reducer gear shaft 82. The larger-diameter gear 83a is held in mesh with a starter drive gear 81a on the drive shaft 81, and an idler gear 84 is held in mesh with the smaller-diameter gear 83b and the starter driven gear 27 supported on the crankshaft 20. These gears 81a, 83a, 83b, and 84 jointly make up a power transmitting mechanism for the starter motor 80.

When the starter motor 80 is energized, the starter drive gear 81a on the drive shaft 81 rotates about its own axis, causing the larger-diameter gear 83a held in mesh with the starter drive gear 81a and the smaller-diameter gear 83b to rotate at a reduced speed. The smaller-diameter gear 83b causes the idler gear 84 to rotate the starter driven gear 27 about its own axis at a reduced speed. The rotation of the starter drive gear 27 is transmitted through the one-way clutch 29 to the outer rotor 30r of the generator 30, which rotates the crankshaft 20 about its own axis, thereby starting the internal combustion engine 10.

The left crankcase member 11L has a mating surface 11Lg (see FIGS. 2 and 13) to which the mating surface 50g (see FIG. 7) of the generator cover 50 is mated, and the left side of the left bearing wall 11Lw of the left crankcase member 11L is covered with the generator cover 50, defining a generator chamber 50G between the left bearing wall 11Lw and the generator cover 50. The generator 30 and the power transmitting mechanism for the starter motor 80 are housed in the generator chamber 50G.

The right crankcase member 11R has a mating surface 11Rf (see FIG. 17) on its left side to which the left crankcase member 11L is mated. The mating surface 11Rf has a pump housing 91h defined concavely therein that houses the rotor of a scavenging pump 91. The right crankcase member 11R also has a mating surface on its right side to which a pump cover 54 (see FIG. 3) is mated. The mating surface has a pump housing 95h (see FIG. 18) defined concavely therein that houses the rotor of a feed pump 95. As will be noted from FIGS. 3 and 5, the pump housing 91h and the pump housing 95h are formed back to back in symmetrical positions in the leftward and rightward directions.

The scavenging pump 91 and the feed pump 95 are actuated by a common pump drive shaft 100 that extends centrally through the pump housing 91h and the pump housing 95h.

The pump drive shaft 100 has a right end portion extending through the pump cover 54 and projecting therefrom to the right. As FIG. 3 shows, a pump driven gear 101 is fitted over the projecting right end portion of the pump drive shaft 100 and held in mesh with the primary driven gear 45 of the transmission clutch 46.

Therefore, the rotation of the crankshaft 20 is transmitted through the primary drive gear 36 to the pump driven gear 101, actuating the scavenging pump 91 and the feed pump 95.

The structure of a lubricating system of the internal combustion engine 10 will be described below.

Figure 19:
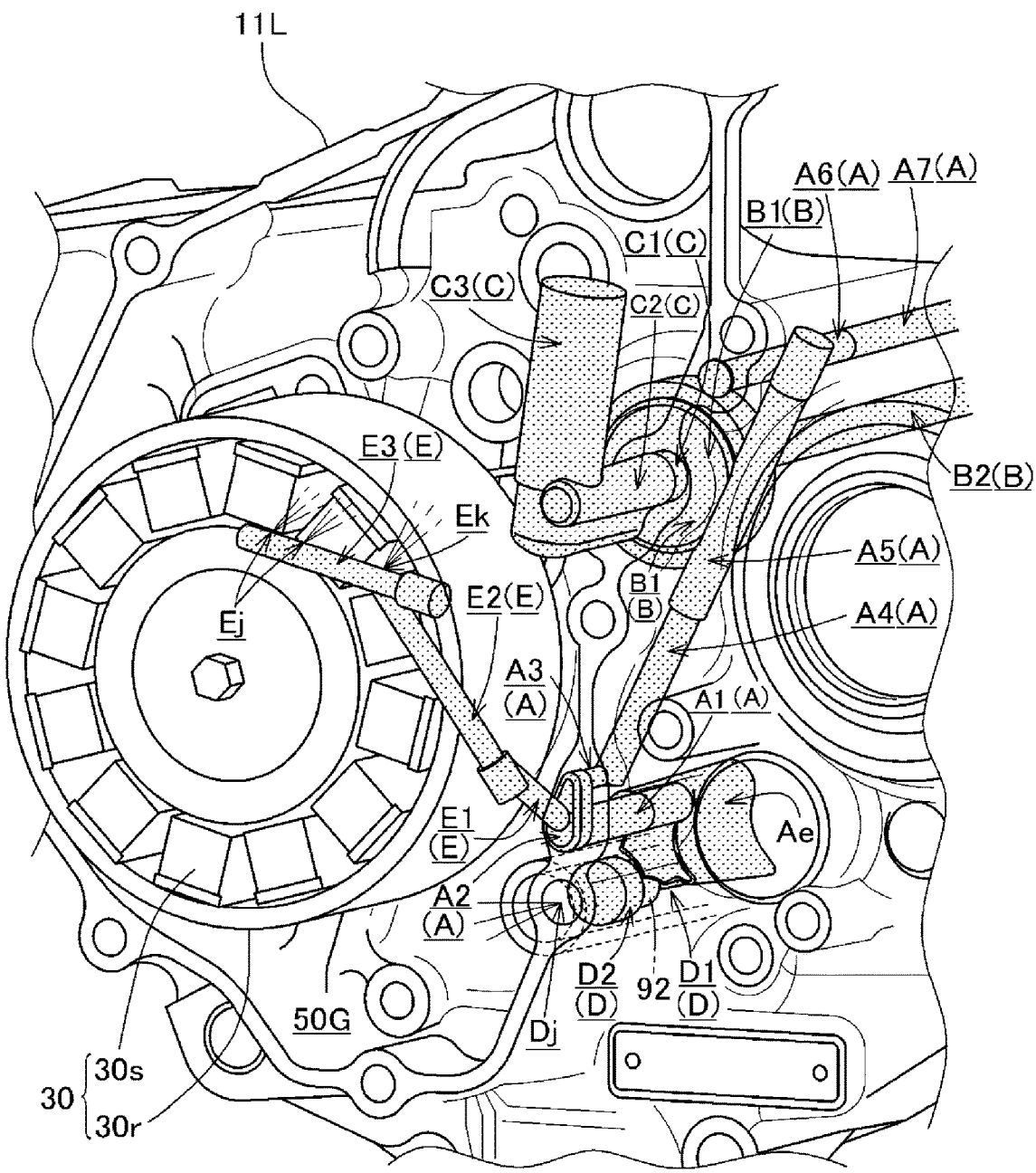
FIG. 19 is a perspective view of a lubricating oil passage assembly for lubricating oil discharged from a scavenging pump.

FIG. 19 is a perspective view of a lubricating oil passage assembly of the lubricating system for guiding lubricating oil discharged from the scavenging pump 91. The lubricating oil passage assembly associated with the scavenging pump 91 will be described below mainly with reference to FIG. 19.

In FIG. 19, the lubricating oil passage assembly is depicted stippled.

The scavenging pump 91 that is housed in the pump housing 91h defined concavely in the mating surface 11Rf of the right crankcase member 11R draws oil on the bottom of the crankcase chamber 11C in the crankcase 11 into an inlet port Ai (see FIGS. 14 and 17) and discharges it from an outlet port Ae (positioned in a lower portion of the lubricating oil passage assembly depicted in FIG. 19).

The lubricating oil passage assembly includes a scavenger lubricating oil passage A extending from the outlet port Ae in the left crankcase member 11L. The scavenger lubricating oil passage A includes an upstream-end lubricating oil passageway A1 which extends to the left through the left crankcase member 11L and is open at the mating surface 11Lg (see FIGS. 13 and 14) of the right crankcase member 11L. The lubricating oil passageway A1 is held in fluid communication with a branch oil slot A2 (see FIG. 7) that is defined in the mating surface 50g of the generator cover 50.

Figure 15:
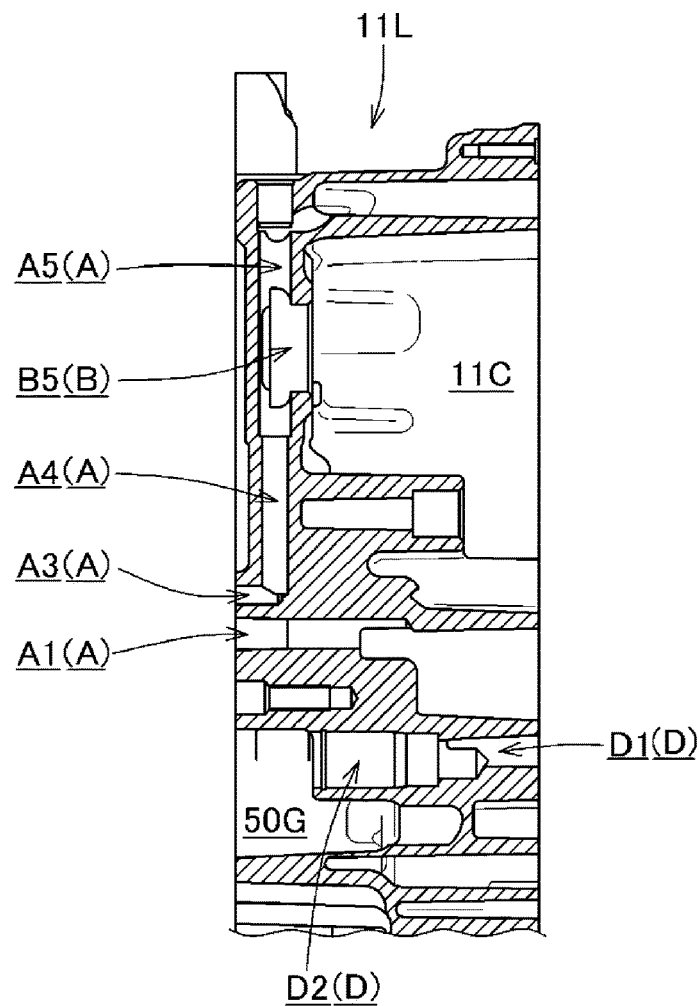
FIG. 15 is a cross-sectional view taken along line XV-XV of FIG. 13.
Figure 16:
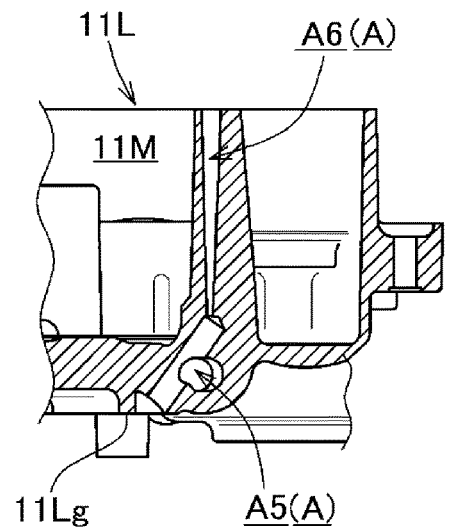
FIG. 16 is a cross-sectional view taken along line XVI-XVI of FIG. 13.

The lubricating oil passage assembly also includes a scavenger relief cooling oil passage D, which serves as a first cooling oil passage, branched to the left from the outlet port Ae in the left crankcase member 11L. As depicted in FIGS. 13 and 15, the scavenger relief cooling oil passage D includes a relief cooling oil passageway D1 defined in the left crankcase member 11L extending to the left into an enlarged-diameter relief cooling oil passageway D2 that has an open left end serving as an ejection port Dj that is open into the generator chamber 50G (see FIGS. 2, 5, 13, and 19).

Figure 5:
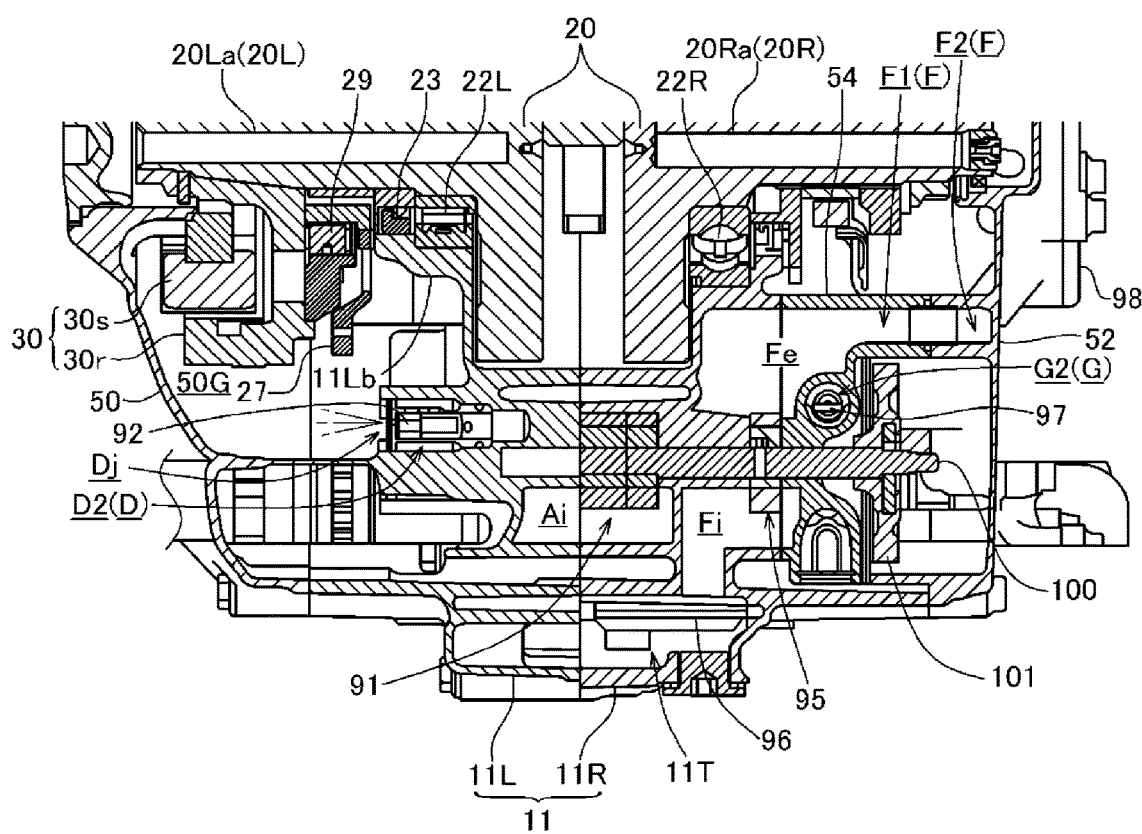
FIG. 5 is a cross-sectional view taken along line V-V of FIG. 2.

As depicted in FIGS. 2, 3, and 5, a scavenger relief valve 92 disposed in the relief cooling oil passageway D2.

Excessive oil discharged from the scavenger relief valve 92 is ejected from the ejection port Dj of the relief cooling oil passageway D2 into the generator chamber 50G. As depicted in FIG. 2, the open end of the relief cooling oil passageway D2 is located in a lower rear region of the generator chamber 50G. Specifically, the open end of the relief cooling oil passageway D2 is positioned outside of the outer rotor 30r of the generator 30 and obliquely downward and rearward thereof as viewed in the left-hand side elevation in FIG. 2 and is positioned rightward of the generator 30 (see FIG. 19).

Therefore, excessive oil from the scavenging pump 91 under an adjusted pressure is discharged from the scavenging relief valve 92 and ejected from the ejection port Dj to the outer side surface of the bottom wall of the cup-shaped outer rotor 30r and the outer circumferential surface of the hollow cylindrical portion thereof, thereby cooling the outer rotor 30r (see FIGS. 3 and 5).

The excessive oil contains a large amount of oil mist, which is effective to efficiently cool the outer rotor 30r by rotation with the outer rotor 30r.

The lubricating oil passageway A1 extending from the outlet port Ae of the scavenging pump 91 to the left through the left crankcase member 11L is held in fluid communication with the branch oil slot A2 defined in the mating surface 50g of the generator cover 50. A second cooling oil passageway E branched and extending from the branch oil slot A2 is defined in the generator cover 50.

Figure 7:
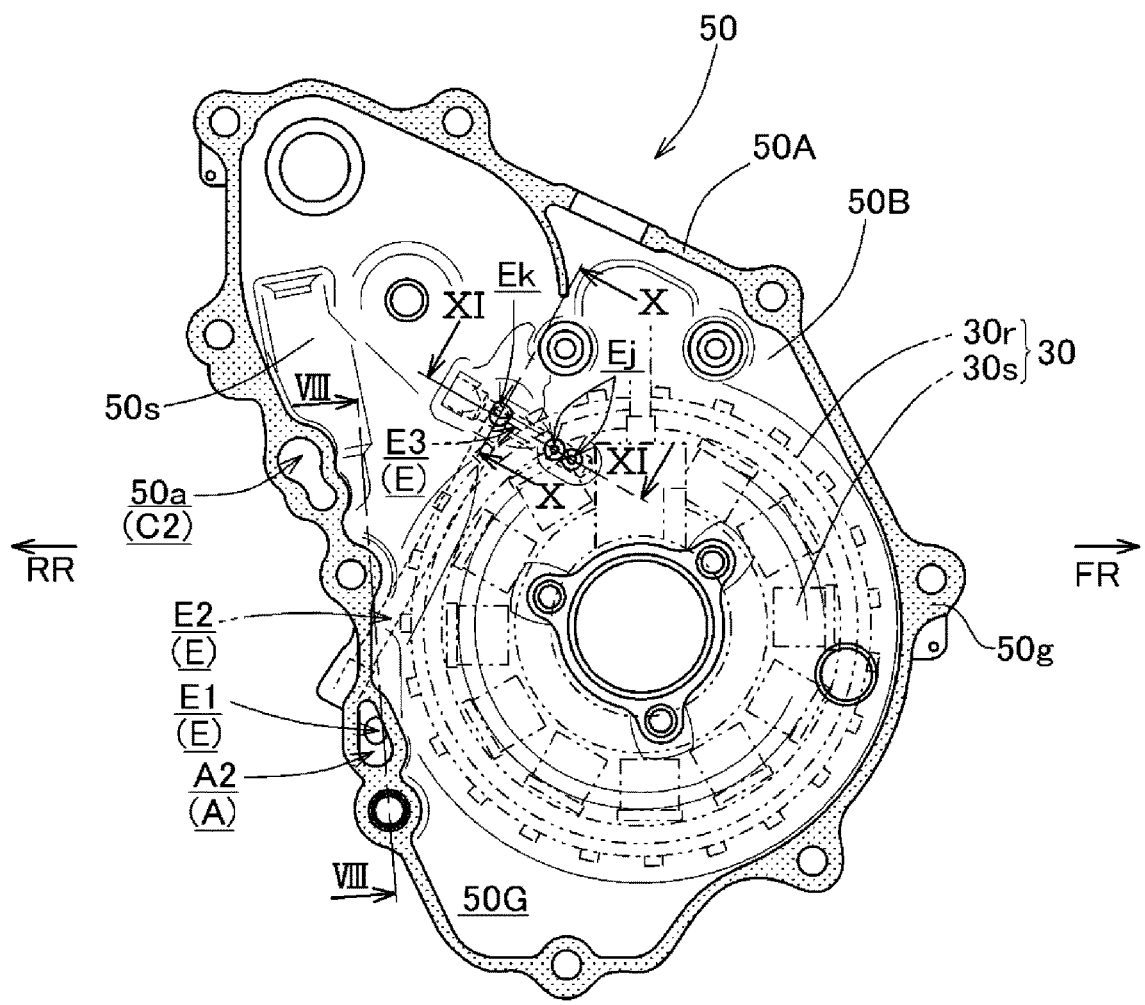
FIG. 7 is a right-hand side elevational view of the electric generator cover.
Figure 8:
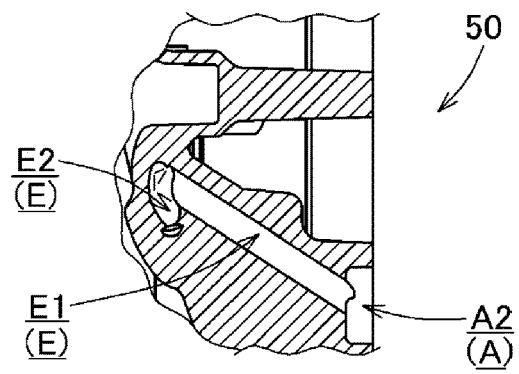
FIG. 8 is a cross-sectional view taken along line VIII-VIII of FIG. 7.

As indicated in FIG. 7, the generator cover 50 is of a modified cup shape having a peripheral wall 50A and a side wall 50B that closes a left-hand opening in the peripheral wall 50A. The mating surface 50g includes the end face of an edge surrounding the opening in the peripheral wall 50A.

The second cooling oil passageway E includes a cooling oil passageway E1 branched from the branch oil slot A2 defined in the mating surface 50g of the generator cover 50. The cooling oil passageway E1 extends from the branch oil slot A2 obliquely leftward in the peripheral wall 50A (see FIGS. 8 and 19).

Figure 9:
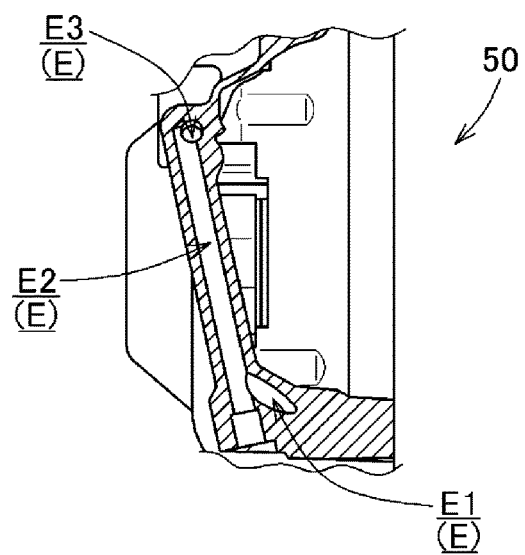
FIG. 9 is a cross-sectional view taken along line IX-IX of FIG. 6.
Figure 10:
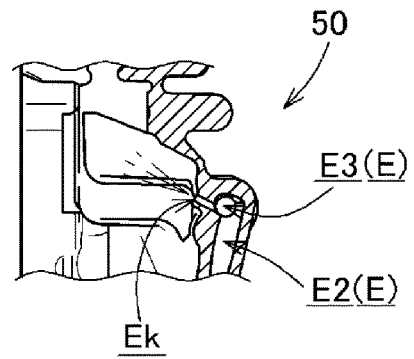
FIG. 10 is a cross-sectional view taken along line X-X of FIG. 7.
Figure 11:
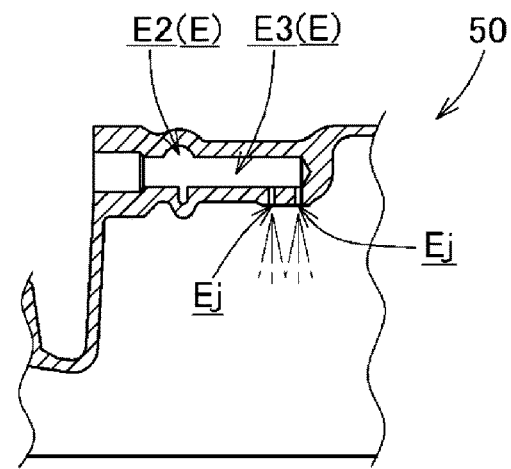
FIG. 11 is a cross-sectional view taken along line XI-XI of FIG. 7.
Figure 12:
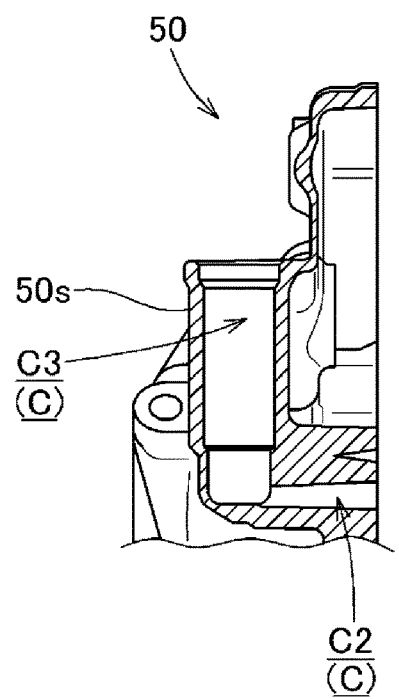
FIG. 12 is a cross-sectional view taken along line XII-XII of FIG. 6.

The cooling oil passageway E1 has a left end crossing and held in fluid communication with the lower end of a cooling oil passageway E2 defined substantially vertically in the side wall 50B of the generator cover 50 (see FIGS. 6, 9, and 19).

The cooling oil passageway E2 has an upper end crossing and held in fluid communication with the rear end of a downstream-end cooling oil passageway E3 defined obliquely forwardly and downwardly in the side wall 50B (see FIGS. 6, 9, 10, and 19).

In FIG. 2, which is a left-hand side elevational view with the generator cover 50 omitted from illustration, the cooling oil passageway E2 and a downstream-end cooling oil passageway E3 are depicted stippled with their profiles indicated by imaginary lines (two-dot-and-dash lines). In FIG. 7, which is a rear view or right-hand side elevational view of the generator cover 50 that covers the left side of the generator 30, the position of the generator 30 with respect to the generator cover 50 is indicated by imaginary lines (two-dot-and-dash lines).

In FIGS. 2 and 7, the cooling oil passageway E3 overlaps an upper portion of the generator 30 as viewed in side elevation.

The hollow cylindrical portion of the cup-shaped outer rotor 30r of the generator 30 is open to the left, so that the cooling oil passageway E3 is positioned in facing relation to the inner stator 30s disposed in the hollow cylindrical portion of the cup-shaped outer rotor 30r (see FIG. 19).

The cooling oil passageway E3 positioned in facing relation to the inner stator 30s has two ejection ports Ej for ejecting lubricating oil to the inner stator 30s.

Since the two ejection ports Ej defined in the downstream-end cooling oil passageway E3 of the second cooling oil passage E branched from the scavenger lubricating oil passage A eject lubricating oil to the inner stator 30s of the generator 30, the inner stator 30s having the coils 30sc that generate heat is directly cooled by the lubricating oil.

As depicted in FIG. 7, the downstream-end cooling oil passageway E3 also has an ejection port Ek positioned upstream as viewed in side elevation. The ejection port Ek is positioned outside of the outer circumferential surface of the outer rotor 30r, and ejects lubricating oil to the starter driven gear 27 across and over the outer circumferential surface of the outer rotor 30r, thereby lubricating the starter driven gear 27 and its bearing.

Excessive oil is discharged from the scavenger relief valve 92 disposed in the downstream relief cooling oil passageway D2 of the scavenger relief cooling oil passage D (first cooling oil passage) that is branched from the outlet port Ae, and ejected from the ejection port Dj to the outer rotor 30r, thereby cooling the outer rotor 30r.

As described above, the lubricating oil passage assembly includes the scavenger relief cooling oil passage D (first cooling oil passage) branched from the scavenger lubricating oil passage A toward the generator 30 and the second cooling oil passage E. The outer rotor 30r of the generator 30 is cooled by excessive oil ejected from the ejection port Dj of the downstream-end relief cooling oil passageway D2 of the scavenger relief cooling oil passage D, and the inner stator 30s of the generator 30 is cooled by lubricating oil ejected from the two ejection ports Ej of the downstream-end cooling oil passageway E3 of the second cooling oil passage E. Consequently, the generator 30 in its entirety can efficiently be cooled by the lubricating oil for increased electric power generation efficiency.

The scavenger lubricating oil passage A also includes a lubricating oil passageway A3 extending from the branch oil slot A2 to the right in the left crankcase member 11L, and a lubricating oil passageway A4 extending from the lubricating oil passageway A3 obliquely upwardly in the left crankcase member 11L (see FIGS. 13, 15, and 19).

The lubricating oil passageway A4 is held in fluid communication with a lubricating oil passageway A5 that extends further obliquely upwardly in the left crankcase member 11L. The lubricating oil passageway A5 has an upper end held in fluid communication with a lubricating oil passageway A6 that extends to the left into an upper wall of the left crankcase member 11L (see FIGS. 14, 15, and 19).

Figure 17:
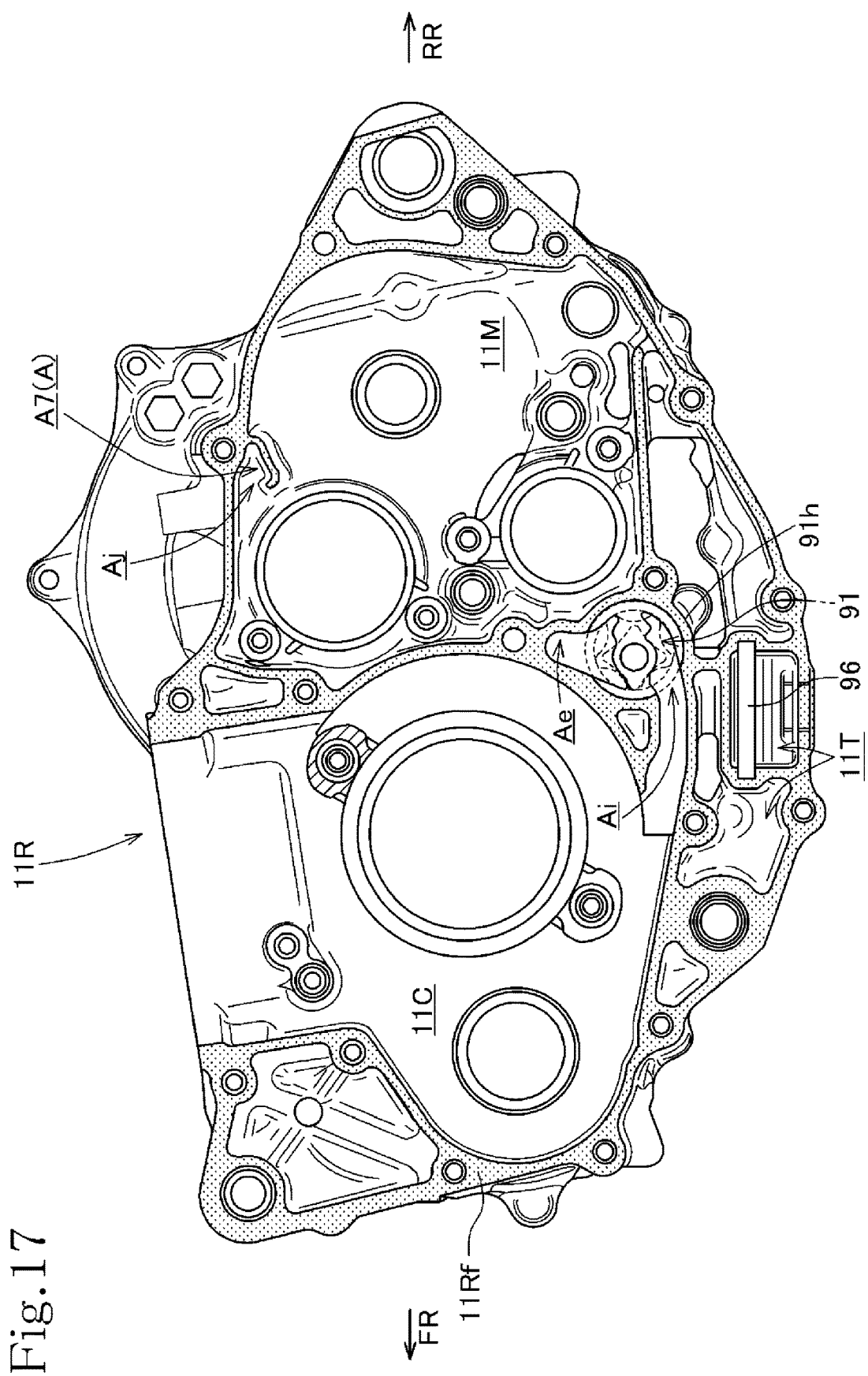
FIG. 17 is a left-hand side elevational view of a right crankcase member.

The lubricating oil passageway A6 in the left crankcase member 11L is held in fluid communication with a lubricating oil passageway A7 in the right crankcase member 11R (see FIGS. 17 and 19).

The lubricating oil passageways A6 and A7 serve as downstream-end lubricating oil passageways of the scavenger lubricating oil passage A.

The lubricating oil passageways A6 and A7 are defined in an upper wall of the crankcase 11 along leftward and rightward vehicle widthwise directions and are positioned above a region where the main gear train 41g supported on the main shaft 41 of the transmission 40 and the counter gear train 42g supported on the countershaft 42 thereof are held in mesh with each other.

The downstream-end lubricating oil passageways A6 and A7 of the scavenger lubricating oil passage A have a plurality of discharge ports Aj (see FIGS. 14 and 17) from which lubricating oil drops onto the main gear train 41g and the counter gear train 42g that mesh with each other, to lubricate them.

Figure 14:
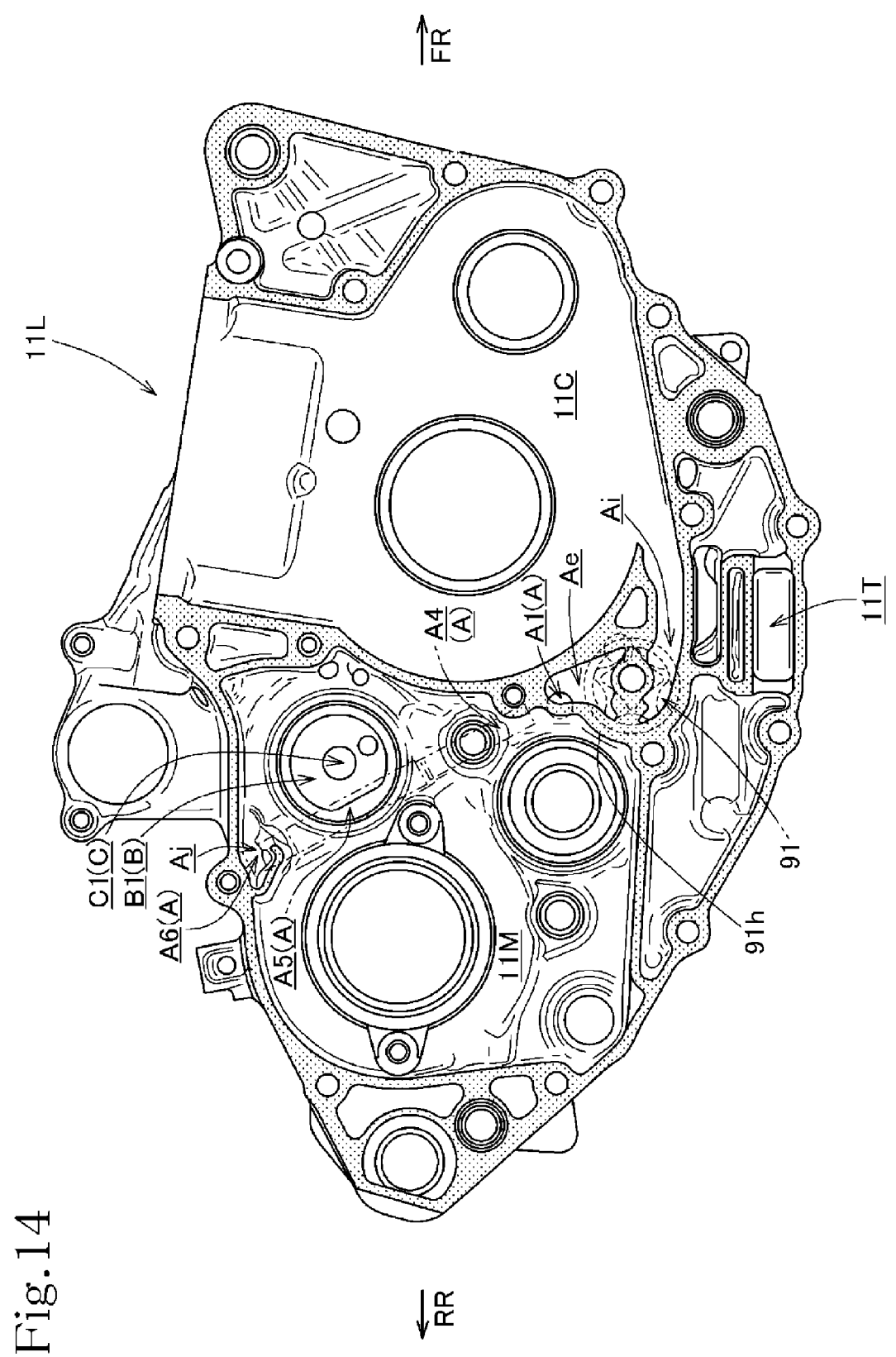
FIG. 14 is a right-hand side elevational view of the left crankcase member.

The lubricating oil passageway A5 that is defined in the left bearing wall 11Lw has a portion overlapping and held in fluid communication with a bearing cavity B1 holding the bearing 41b fitted therein (see FIGS. 14 and 15).

The bearing cavity B1 serves as a branch lubricating oil passageway B1.

As depicted in FIG. 4, lubricating oil branched from the lubricating oil passageway A5 into the branch lubricating oil passageway (bearing cavity) B1 lubricates the bearing 41b and flows along a left end face of the main shaft 41 into an axial oil passageway B2 which is provided by the axial hole defined in the main shaft 41.

The main shaft 41 on which the gear train 41g is supported has a supply port Bj defined therein for supplying lubricating oil from the axial oil passageway B2 to a gear sliding surface of the main shaft 41.

Specifically, the supply port Bj is open at the gear sliding surface of the main shaft 41 on which a shift gear slides axially in the leftward and rightward directions, and supplies lubricating oil to the gear sliding surface for lubricating the gear sliding surface for the shift gear to slide on the main shaft 41.

Furthermore, since the release rod 61 of the clutch release mechanism 60 is inserted in the axial hole in the main shaft 41 which serves as the axial oil passageway B2, lubricating oil that flows into the axial hole in the main shaft 41 also lubricates the release rod 61 for sliding therein.

The bottom wall of the bearing cavity or branch lubricating oil passageway B1 in the left crankcase member 11L has a circular opening defined centrally therein that serves as a lubricating oil passageway C1 (see FIG. 14), and the generator cover 50 has the hole 50a (see FIG. 7) in which the release rod 61 is inserted, defined in a portion thereof that is aligned with the lubricating oil passageway C1.

The hole 50a serves as a lubricating oil passageway C2 which is held in fluid communication with the bearing cavity or branch lubricating oil passageway B1 through the lubricating oil passageway C1 (see FIG. 4).

The hole 50a is also held in fluid communication with a lubricating oil passageway C3 in the tubular side wall portion 50s in which the release camshaft 64 is inserted.

The lubricating oil passageway C1 and the lubricating oil passageway C2, i.e., the hole 50a, that extend from the bearing cavity B1, i.e., the branch lubricating oil passageway B1, in a direction away from the axial oil passageway B2 is held in fluid communication with the lubricating oil passageway C3 in the tubular side wall portion 50s (see FIG. 19).

Therefore, lubricating oil branched from the branch lubricating oil passageway B1 into the lubricating oil passageway C1 flows through the lubricating oil passageway C2 into the lubricating oil passageway C3 in the tubular side wall portion 50s, lubricating the release camshaft 64 for its turning motion.

The lubricating oil passage assembly for lubricating oil discharged from the scavenging pump 91 is constructed as depicted in FIG. 19.

The scavenger relief valve 92 is disposed in a position lower than any of the scavenger lubricating oil passage A, the branch lubricating oil passageway B1, the axial oil passageway B2, the lubricating oil passageways C1, C2, C3, the scavenger relief cooling oil passage (the first cooling oil passage) D, and the second cooling oil passage E.

Consequently, all of the scavenger lubricating oil passage A, the branch lubricating oil passageway B1, the axial oil passageway B2, lubricating oil passageways C1, C2, C3, the scavenger relief cooling oil passage (the first cooling oil passage) D, and the second cooling oil passage E are filled with lubricating oil. When the internal oil pressure builds up until it goes beyond a predetermined internal pressure of the scavenger relief valve 92, the scavenger relief valve 92 is opened to supply lubricating oil to all necessary components under suitable oil pressure for enhanced lubricating and cooling performance.

The scavenging pump 91 is provided in the right crankcase member 11R along the mating surfaces of the left crankcase member 11L and the right crankcase member 11R. The feed pump 95 is provided in the right crankcase member 11R along the mating surfaces of the right crankcase member 11R and the pump cover 54 that is mounted on the right side of the right crankcase member 11R. As depicted in FIG. 3, the feed pump 95 is disposed remotely from the generator 30 disposed on the left crankcase member 11L across the scavenging pump 91 disposed in the right crankcase member 11R.

The feed pump 95 is disposed closely to the scavenging pump 91 out of physical interference with the generator 30, and the scavenger relief cooling oil passage (the first cooling oil passage) D and the second cooling oil passage E that extend from the scavenging pump 91 to the generator 30 are shortened, making it possible to reduce the size of the internal combustion engine 10.

Since the scavenger relief valve 92 is provided in the left crankcase member 11L on which the generator 30 is disposed, the lubricating oil passage assembly provides a compact structure wherein the scavenger relief valve 92 is disposed out of physical interference with the feed pump 95 disposed in the right crankcase member 11L and excessive oil discharged from the scavenger relief valve 92 is used to cool the generator 30.

Figure 20:
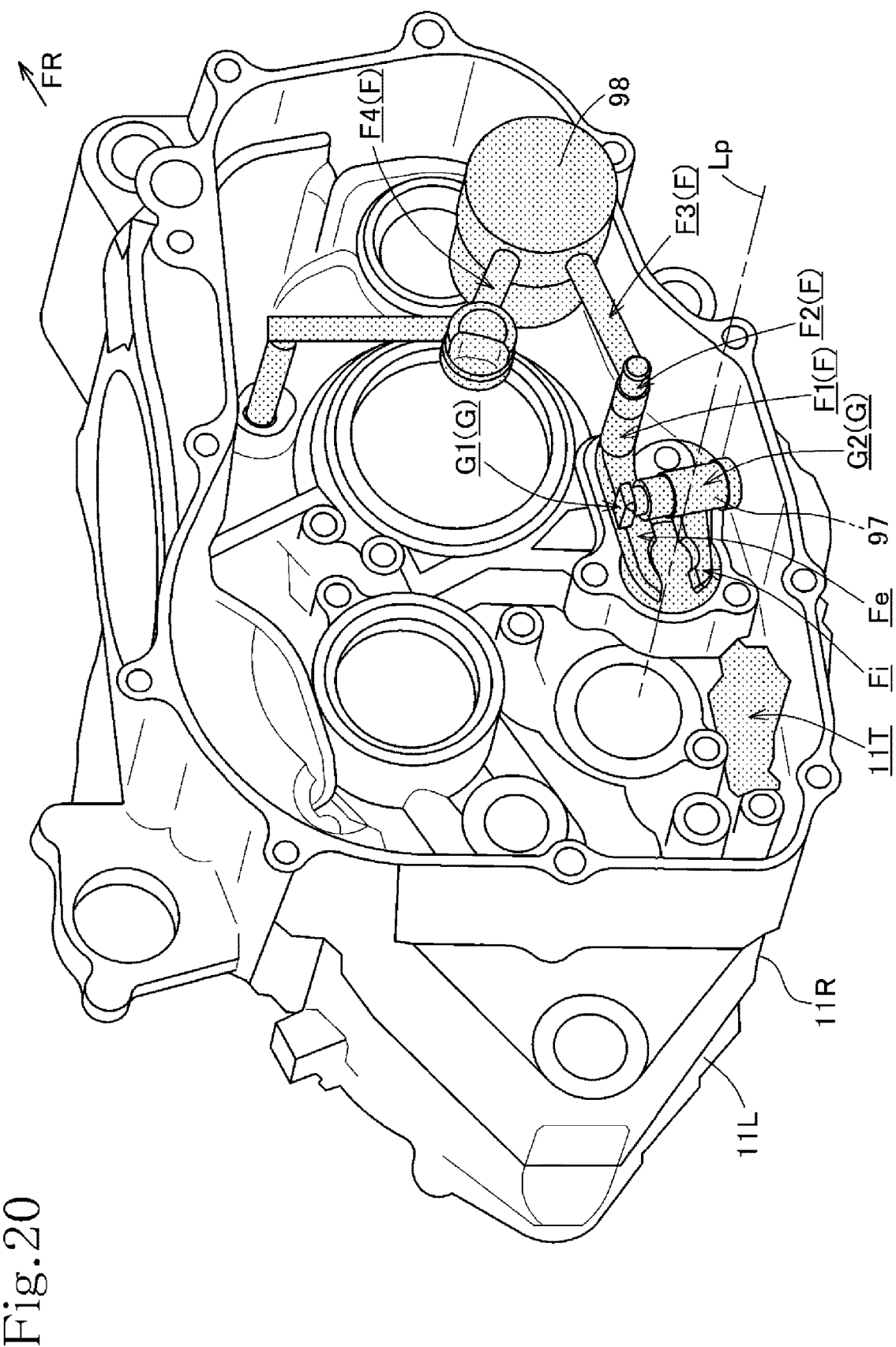
FIG. 20 is a perspective view of a lubricating oil passage assembly for lubricating oil discharged from a feed pump.

Part of a feeder lubricating oil passage F of the lubricating system for guiding lubricating oil discharged from the feed pump 95 is depicted stippled in perspective in FIG. 20. An upstream portion of the feeder lubricating oil passage F for passing lubricating oil discharged from the feed pump 95 will be described below mainly with reference to FIG. 20.

Figure 18:
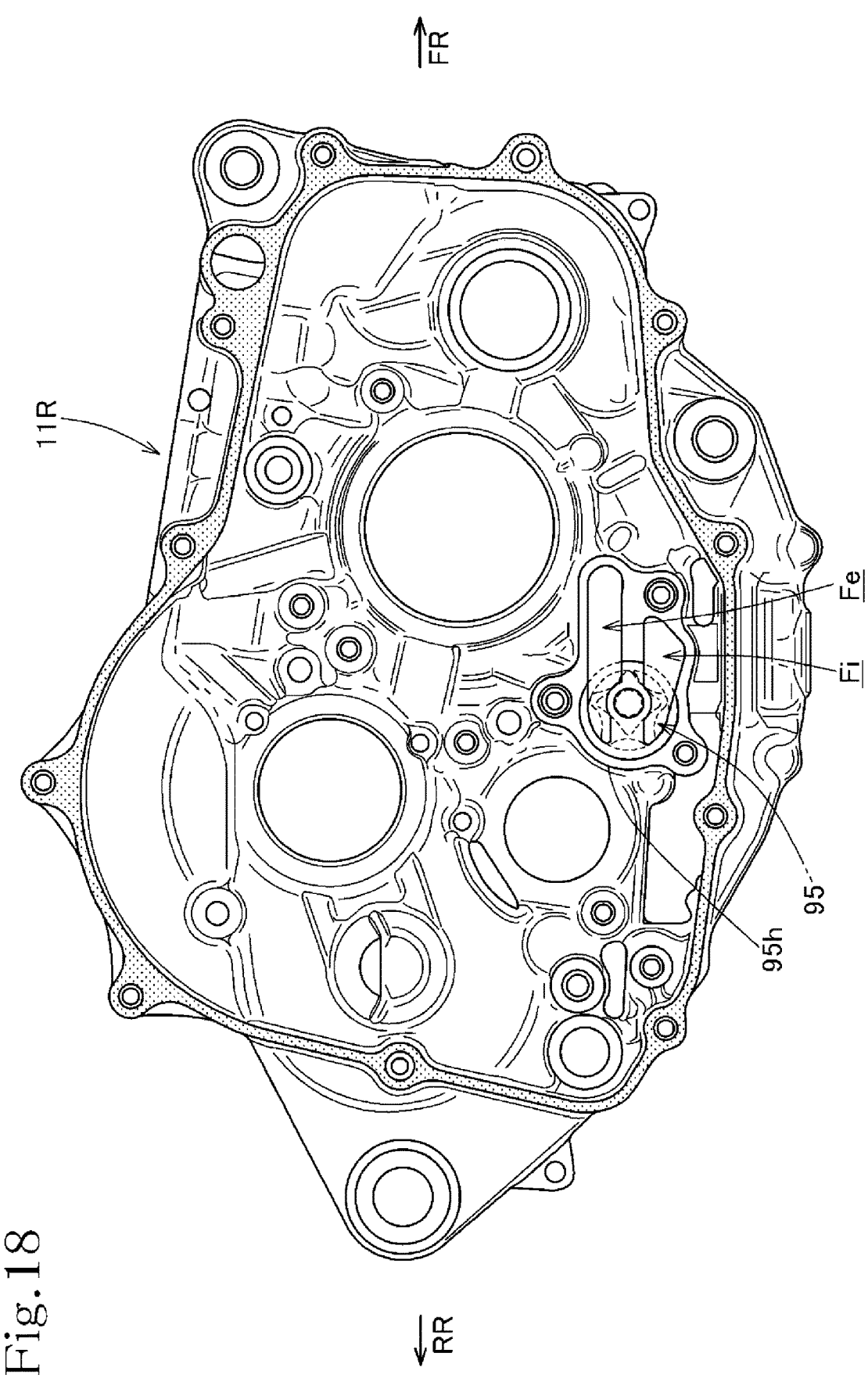
FIG. 18 is a right-hand side elevational view of the right crankcase member.

As depicted in FIGS. 5 and 18, the rotor of the feed pump 95 is disposed in the pump housing 95h that is defined concavely in the mating surface of the right crankcase member 11R to which the pump cover 54 is mated. An inlet port Fi for the feed pump 95 is defined in the right crankcase member 11R and the pump cover 54 below the feed pump 95, and an outlet port Fe for the feed pump 95 is defined in the right crankcase member 11R and the pump cover 54 above the feed pump 95.

The inlet port Fi is held in fluid communication with the oil reservoir 11T in the lower portion of the transmission chamber 11M in the crankcase 11 through a strainer 96 (see FIG. 5).

As depicted in FIG. 20, the feeder lubricating oil passage F includes a feeder relief oil passage G branched to the right from the outlet port Fe. The feeder relief oil passage G includes a relief oil passageway G1 extending to the right and having a right end from which a downstream-end relief oil passageway G2 is bent downwardly.

The feeder relief oil passage G is defined in the pump cover 54 (see FIG. 5).

A feeder relief valve 97 is disposed in the downstream-end relief oil passageway G2 of the feeder relief oil passage G.

Excessive oil discharged from the feeder relief valve 97 is ejected downwardly.

As depicted in FIG. 20, the feeder relief valve 97 in the downstream-end relief oil passageway G2 is disposed on the right side of the feed pump 95 and oriented downwardly in a direction perpendicular to the axis Lp of the pump drive shaft 100.

As the scavenging pump 91 and the feed pump 95 are actuated by the common pump drive shaft 100, the scavenging pump 91 and the feed pump 95 can be positioned closely to each other and arranged compactly by the common pump drive shaft 100. Since the relief oil passageway G2 branched from the outlet port Fe of the feed pump 95 and housing the feeder relief valve 97 therein is disposed on the right side of the feed pump 95 remotely from the scavenging pump 91 and oriented in the direction perpendicular to the axis Lp of the pump drive shaft 100, the feeder relief valve 97 is disposed compactly in the vicinity of the feed pump 95 out of physical interference with the scavenging pump 91. Consequently, the feeder lubricating oil passage F is shortened, making the lubricating system small in size.

The feeder lubricating oil passage F also includes a lubricating oil passageway F1 defined in the pump cover 54 and extending from the outlet port Fe to the right. The lubricating oil passageway F1 defined in the pump cover 54 is held in fluid communication with a lubricating oil passageway F2 defined in the right case cover 52 (see FIGS. 5 and 20). A lubricating oil passageway F3 extends forwardly from the lubricating oil passageway F2 and is held in fluid communication with an oil filter 98.

A lubricating oil passageway F4 extends from the oil filter 98 for supplying lubricating oil to various components to be lubricated, which include the crankshaft 20 and a valve operating mechanism in the cylinder head 13, for example.

The lubricating oil passage assembly in the internal combustion engine 10 is of the structure described above. The first cooling oil passage and the second cooling oil passage are branched from the scavenger lubricating oil passage A for guiding lubricating oil to cool the generator 30, and the downstream-end lubricating oil passageways A6 and A7 of the scavenger lubricating oil passage A supply lubricating oil for lubricating the region where the main gear train 41g and the counter gear train 42g of the transmission 40 are held in mesh with each other. Lubricating oil supplied from the branch lubricating oil passageway (bearing cavity) B1 branched from the lubricating oil passageway A5 lubricates the bearing 41b, and lubricating oil supplied form the axial oil passageway B2 extending from the branch lubricating oil passageway B1 lubricates the gear sliding surface for the shift gear to slide on the main shaft 41. Lubricating oil branched from the branch lubricating oil passageway B1 into the lubricating oil passageways C1, C2, and C3 lubricates the clutch release mechanism 60.

Lubricating oil supplied from the scavenging pump 91 to the scavenger lubricating oil passage A is used to cool the generator 30 and also to lubricate various components. Therefore, an upper limit for the oil pressure discharged from the feed pump 95 can be lowered, thereby reducing the burden on the feed pump 95 and the load applied from the feed pump 95 to oil seals in the feeder relief oil passage G, so that the feed pump 95 can be reduced in size.

The electric generator cooling structure for cooling the electric generator provided in the internal combustion engine according to the embodiment of the present invention has been described above. The present invention is not limited to the illustrated embodiment, but various changes and modifications may be made to the embodiment without departing from the scope of the invention.

DESCRIPTION OF REFERENCE SYMBOLS

10 . . . Internal combustion engine, 11 . . . Crankcase, 11C . . . Crankcase chamber, 11M . . . Transmission chamber, 11T . . . Oil reservoir, 11L . . . Left crankcase member, 11R . . . Right crankcase member, 11Lw, 11Rw . . . Bearing wall, 11Lb, 11Rb . . . Main bearing casing, 12 . . . Cylinder block, 12a . . . Cylinder, 13 . . . Cylinder head, 14 . . . Cylinder head cover, 15 . . . Stud bolt, 16 . . . Piston, 17 . . . Piston pin, 18 . . . Connecting rod, 19 . . . Spark plug, 20 . . . Crankshaft, 20L, 20R . . . Crankshaft members, 20La, 20Ra . . . Crankshaft body, 20Lw, 20Rw . . . Crankshaft web, 21 . . . Crankpin, 22L . . . Roller bearing, 22R . . . Ball bearing, 23 . . . Oil seal ring, 24 . . . Communication hole, 25 . . . Drive chain sprocket, 26 . . . Nut, 27 . . . Starter driven gear, 28 . . . Needle bearing, 29 . . . One-way clutch, 30 . . . AC electric generator, 30R . . . Generator rotor, 30r . . . Outer rotor, 30f . . . Flywheel, 30s . . . Inner stator, 31 . . . Washer, 32 . . . Nut, 33 . . . Roller bearing, 34 . . . Key, 35 . . . Balancer drive gear, 36 . . . Primary drive gear, 37 . . . Washer, 38 . . . Nut, 40 . . . Transmission, 41 . . . Main shaft, 42 . . . Countershaft, 43 . . . Output sprocket, 44 . . . Drive chain, 45 . . . Primary driven gear, 46 . . . Transmission clutch, 40o . . . Clutch outer member, 46i . . . Clutch inner member, 46p . . . Pressure plate, 46s . . . Clutch spring, 47 . . . Balancer, 47a . . . Balancer shaft, 47w . . . Balance weight, 48 . . . Bearing, 49 . . . Balancer driven gear, 50 . . . Generator cover, 50G . . . Generator chamber, 50s . . . Tubular side wall portion, 52 . . . Right case cover, 53 . . . Clutch cover, 53f . . . Filter housing, 54 . . . Pump cover, 60 . . . Clutch release mechanism, 61 . . . Release rod, 62 . . . Cap, 63 . . . Bearing, 64 . . . Release camshaft, 65 . . . Clutch release lever, 71, 72 . . . Shift fork shaft, 71a, 72a, 72b . . . Shift fork, 73 . . . Shift drum, 74 . . . Transmission actuating mechanism, 75 . . . Shift spindle, 76 . . . Change arm, 77 . . . Shifter plate, 78 . . . Pin plate, 80 . . . Starter motor, 81 . . . Drive shaft, 81a . . . Starter drive gear, 82 . . . Speed reducer gear shaft, 83a . . . Larger-diameter gear, 83b . . . Smaller-diameter gear, 84 . . . Idler gear, 91 . . . Scavenging pump, 92 . . . Scavenger relief valve
95 . . . Feed pump, 96 . . . Strainer, 97 . . . Feeder relief valve, 98 . . . Oil filter, 100 . . . Pump drive shaft, 101 . . . Pump driven gear, A . . . Scavenger lubricating oil passage, A . . . Inlet port, Ae . . . Outlet port, A1 . . . Lubricating oil passageway, A2 . . . Branch oil slot, A3, A4, A5, A6, A7 . . . Lubricating oil passageway, Aj . . . Discharge port, B1 . . . Bearing cavity (branch lubricating oil passageway), B2 . . . Axial oil passageway, Bj . . . Supply port, C1, C2, C3 . . . Lubricating oil passageway, D . . . Scavenger relief cooling oil passage (first cooling oil passage), D1, D2 . . . Relief cooling oil passageway, Dj . . . Ejection port, E . . . Second cooling oil passage, E1, E2, E3 . . . Cooling oil passageway, Ej . . . Ejection port, Ek . . . Ejection port, F . . . Feeder lubricating oil passage, Fi . . . Inlet port, Fe . . . Outlet port, F1, F2, F3, F4 . . . Lubricating oil passageway, G . . . Feeder relief oil passage, G1, G2 . . . Relief oil passageway

The invention claimed is:

1. An electric generator cooling structure for an internal combustion engine, wherein an electric generator for generating electric energy upon rotation of a crankshaft supported in a crankcase of the internal combustion engine has an outer rotor rotatable in unison with said crankshaft, said outer rotor being of a bottomed hollow cylindrical shape and supporting magnets on an inner circumferential surface thereof, and an inner rotor having coils disposed in said outer rotor, comprising:

a first cooling oil passage and a second cooling oil passage that are branched from a lubricating oil passage of a lubricating system of the internal combustion engine toward said electric generator;

a first ejection port defined in a downstream end of said first cooling oil passage for ejecting lubricating oil to an outer side surface of said outer rotor; and a second ejection port defined in a downstream end of said second cooling oil passage for ejecting lubricating oil to said inner stator disposed in said outer rotor, wherein said lubricating system of the internal combustion engine includes a scavenging pump and a feed pump, the scavenging pump and the feed pump being coaxially arranged, and wherein said first cooling oil passage and said second cooling oil passage are branched from a scavenger lubricating oil passage which guides lubricating oil discharged from said scavenging pump.

2. The electric generator cooling structure for an internal combustion engine according to claim 1, wherein said outer rotor is of a bottomed hollow cylindrical shape having a hollow cylindrical portion and a bottom wall, said bottom wall being fixed to an end of said crankshaft such that said hollow cylindrical portion has an opening directed outward along an axial direction of said crankshaft; and said second cooling oil passage has a downstream portion defined in a generator cover covering an axially outer side of said electric generator.

3. The electric generator cooling structure for an internal combustion engine according to claim 1, wherein said first cooling oil passage includes a scavenger relief cooling oil passage branched from an outlet port of said scavenging pump and housing a scavenger relief valve therein; and said first ejection port is provided in a discharge side of said scavenger relief valve.

4. The electric generator cooling structure for an internal combustion engine according to claim 3, wherein said scavenger lubricating oil passage includes downstream-end lubricating oil passageways defined in an upper wall of said crankcase above a region where gear trains of a transmission disposed in a transmission chamber in said crankcase are held in mesh with each other; and said downstream-end lubricating oil passageways have discharge ports defined therein from which lubricating oil drops onto the gear trains that mesh with each other.

5. The electric generator cooling structure for an internal combustion engine according to claim 4, wherein a branch lubricating oil passageway is branched upstream from said downstream-end lubricating oil passageways of said scavenger lubricating oil passage;

said branch lubricating oil passageway is held in fluid communication with an axial oil passageway defined in a transmission gear shaft on which one of the gear trains is supported; and said transmission gear shaft has a supply port defined therein for supplying lubricating oil from said axial oil passageway to a gear sliding surface of said transmission gear shaft.

6. The electric generator cooling structure for an internal combustion engine according to claim 5, wherein said internal combustion engine includes a clutch provided with a clutch release mechanism and mounted on an end of said transmission gear shaft;

said clutch release mechanism includes a clutch release rod axially movably inserted in said transmission gear shaft, a clutch release lever, and a release cam shaft having a cam face for converting angular movement of said clutch release lever into axial movement of said clutch release rod in said transmission gear shaft to disengage said clutch; and lubricating oil passageways extending from said branch lubricating oil passageway in a direction away from said axial oil passageway are held in fluid communication with a tubular holder by which said release cam shaft is angularly movably held.

7. The electric generator cooling structure for an internal combustion engine according to claim 5, wherein said scavenger relief valve is disposed in a position lower than any of said scavenger lubricating oil passage, said first cooling oil passageway, said second cooling oil passageway, said branch lubricating oil passageway, and said axial oil passageway.

8. The electric generator cooling structure for an internal combustion engine according to claim 3, wherein said crankcase includes a left crankcase member and a right crankcase member that are separated from, but joined to each other;

said scavenging pump is provided along mating surfaces of said left crankcase member and said right crankcase member; and said feed pump is disposed in said crankcase remotely from said electric generator across said scavenging pump.

9. The electric generator cooling structure for an internal combustion engine according to claim 8, wherein said scavenger relief valve is provided in one of said left crankcase member and said right crankcase member on which said electric generator is mounted.

10. The electric generator cooling structure for an internal combustion engine according to claim 8, wherein said scavenging pump and said feed pump are actuatable by a common pump drive shaft;

said feed pump has an outlet port from which a feeder relief oil passage is branched, said feeder relief oil passage housing a feeder relief valve disposed therein; and said feeder relief oil passage is disposed on a side of said feed pump remotely from said scavenging pump and oriented in a direction perpendicular to an axis of the pump drive shaft.

11. The electric generator cooling structure for an internal combustion engine according to claim 6, wherein said scavenger relief valve is disposed in a position lower than any of said scavenger lubricating oil passage, said first cooling oil passageway, said second cooling oil passageway, said branch lubricating oil passageway, and said axial oil passageway.

12. The electric generator cooling structure for an internal combustion engine according to claim 9, wherein said scavenging pump and said feed pump are actuatable by a common pump drive shaft;

said feed pump has an outlet port from which a feeder relief oil passage is branched, said feeder relief oil passage housing a feeder relief valve disposed therein; and said feeder relief oil passage is disposed on a side of said feed pump remotely from said scavenging pump and oriented in a direction perpendicular to an axis of the pump drive shaft.

\* \* \* \* \*